US007336399B2

(12) United States Patent
Nara

(10) Patent No.: US 7,336,399 B2
(45) Date of Patent: Feb. 26, 2008

(54) DOCUMENT IMAGE SCANNING DEVICE THAT PROVIDES IMAGE OF PROPER APPEARANCE WHILE PRESERVING IMAGE DENSITY

(75) Inventor: Wataru Nara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 829 days.

(21) Appl. No.: 09/961,256

(22) Filed: Sep. 25, 2001

(65) Prior Publication Data

US 2002/0060819 A1 May 23, 2002

(30) Foreign Application Priority Data

Sep. 26, 2000 (JP) ............................. 2000-291615
Mar. 15, 2001 (JP) ............................. 2001-073507

(51) Int. Cl.
  *H04N 1/40* (2006.01)
  *H04N 1/405* (2006.01)
  *G06K 15/00* (2006.01)

(52) U.S. Cl. ..................... 358/3.26; 358/3.06; 358/464

(58) Field of Classification Search ................. 358/1.9, 358/530, 518, 2.1, 519, 448, 461, 463, 464, 358/465, 401, 500; 382/167–169, 172, 275
See application file for complete search history.

(56) References Cited

U.S. PATENT DOCUMENTS

| | | | | | |
|---|---|---|---|---|---|
| 5,270,806 | A | * | 12/1993 | Venable et al. ............. | 358/500 |
| 5,388,167 | A | * | 2/1995 | Koga et al. .................. | 382/232 |
| 5,465,160 | A | * | 11/1995 | Kamo et al. ................. | 358/401 |
| 5,519,787 | A | | 5/1996 | Melen ......................... | 382/169 |
| 5,646,744 | A | * | 7/1997 | Knox ........................... | 358/401 |
| 5,689,590 | A | * | 11/1997 | Shirasawa et al. .......... | 382/254 |
| 5,706,368 | A | * | 1/1998 | Mita ........................... | 382/284 |
| 5,740,428 | A | * | 4/1998 | Mortimore et al. ...... | 707/104.1 |
| 5,761,338 | A | * | 6/1998 | Kasamatsu .................. | 382/176 |
| 6,198,845 | B1 | * | 3/2001 | Tse et al. .................... | 382/169 |

FOREIGN PATENT DOCUMENTS

| | | |
|---|---|---|
| EP | 0 580 172 | 1/1994 |
| EP | 0 833 497 | 4/1998 |
| EP | 0 889 643 | 1/1999 |
| JP | 06-152933 | 5/1994 |
| JP | 6-311359 | 11/1994 |

OTHER PUBLICATIONS

U.S. Appl. No. 09/662,173, filed Sep. 14, 2000, Pending.
U.S. Appl. No. 09/961,256, filed Sep. 25, 2001, Pending.
U.S. Appl. No. 10/097,595, filed Mar. 15, 2002, Pending.
U.S. Appl. No. 09/961,256, filed Sep. 25, 2001, Nara.
U.S. Appl. No. 10/612,933, filed Jul. 7, 2003, Ando et al.

* cited by examiner

*Primary Examiner*—Thomas D. Lee
*Assistant Examiner*—James A. Thompson
(74) *Attorney, Agent, or Firm*—Oblon, Spivak, McClelland, Maier & Neustadt, P.C.

(57) ABSTRACT

A device for scanning a document includes a photoelectric conversion unit which scans a document, and supplies image data of the scanned document, a background detecting unit which detects a background level of the image data, an image processing unit which applies one or more types of image processing to the image data, and applies image processing identical to the one or more types of image processing to the detected background level, and a background removal unit which removes background noise from the image data having undergone the image processing according to a threshold that is derived from the background level having undergone the image processing.

35 Claims, 17 Drawing Sheets

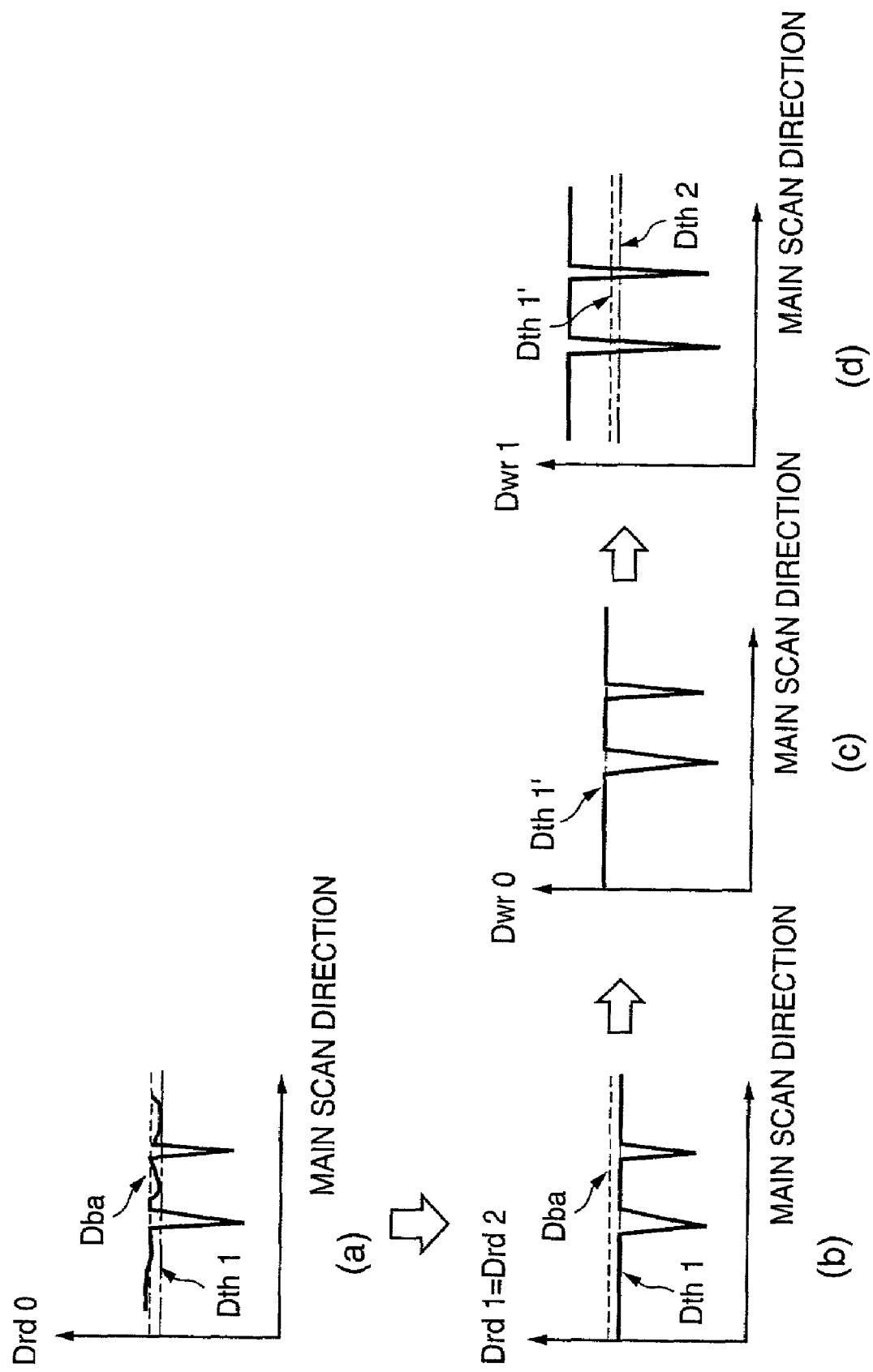

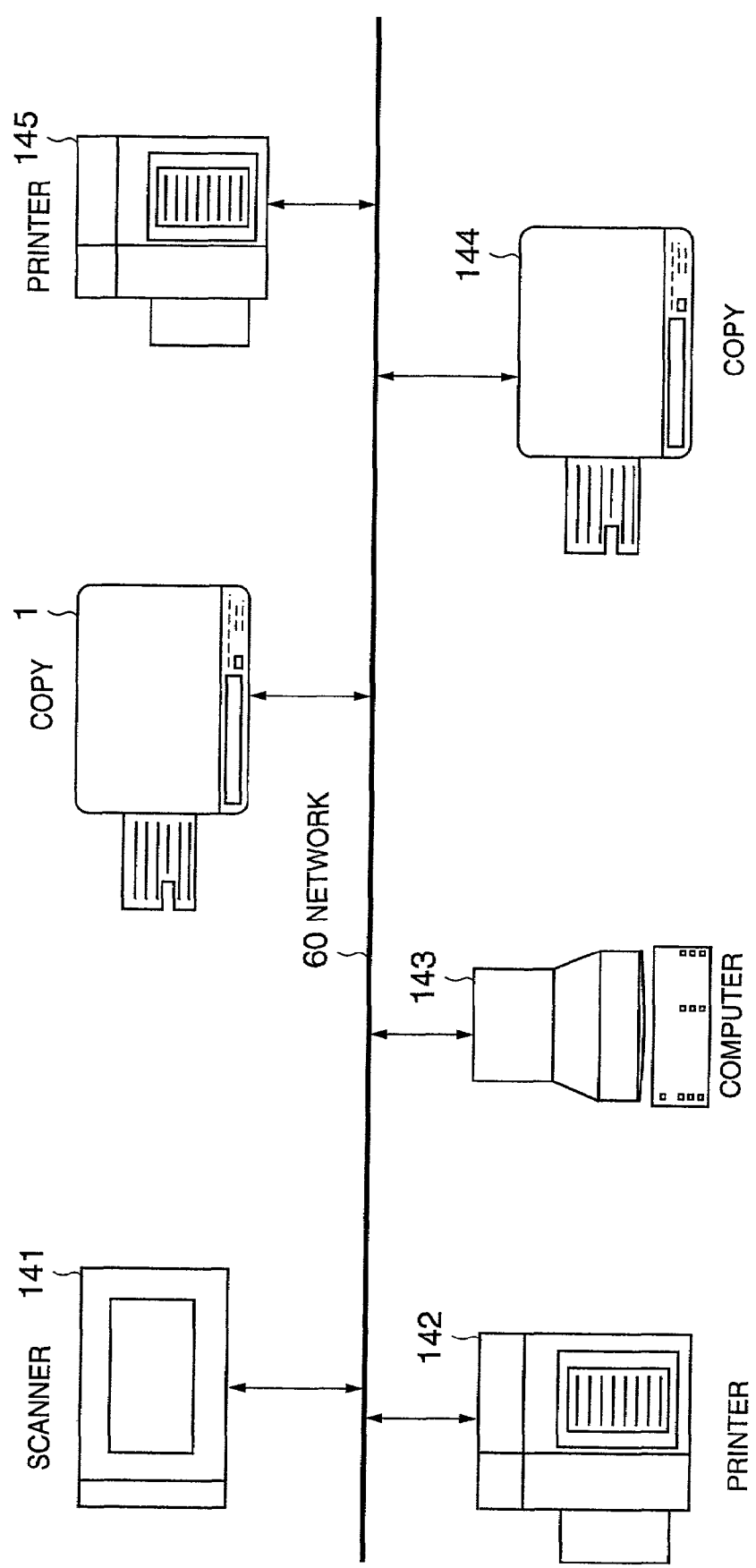

DOCUMENT IMAGE SCANNING DEVICE THAT PROVIDES IMAGE OF PROPER APPEARANCE WHILE PRESERVING IMAGE DENSITY

BACKGROUND OF THE INVENTION

1. Field of the Invention

The present invention generally relates to image scanning apparatuses, image forming apparatuses, and image data processing methods, and particularly relates to an image scanning apparatus, an image forming apparatus, and an image data processing method that remove background noise from image data.

2. Description of the Related Art

Japanese Patent Laid-open Application No. 6-311359 discloses a background noise removing apparatus that removes background noise from image data of an original document after shading correction but prior to predetermined image processing. In this technique, not only the image data below a predetermined threshold is removed as background noise (i.e., the image data above the threshold is removed if the white level is considered higher than the black level), but also γ is gradually changed around the predetermined threshold in an attempt to reduce peculiar appearance of a resulting image at gray-scale levels around the threshold.

Nonetheless, this technique disclosed in Japanese Patent Laid-open Application No. 6-311359 basically discards part of the image data below the predetermined threshold by detecting a background level of the image data obtained after shading correction. Such processing has an advantage of proper reservation of image densities, but γ of the image data undesirably exhibits a large change around the threshold level. Because of this, subsequent image processing is affected, and changes in image levels around the threshold end up creating peculiar appearance.

The reason why peculiar image appearance is created when image data below a threshold level is discarded is that image data ends up having large data value changes around the threshold level, which are further enhanced through subsequent processing of image data that includes MTF (mean transfer function) correction and smoothing. FIG. 1 is a drawing showing an example of changes of image data after MTF correction with respect to a case in which image data is changed below a threshold level and also with respect to a case in which original image data is preserved. When image data shown in FIG. 1-(a) is subjected to the MTF correction, image as shown in FIG. 1-(b) is obtained. When the image data shown in FIG. 1-(a) is changed to image data as shown in FIG. 1-(c) with respect to the threshold level, the image data as shown in FIG. 1-(d) is obtained after the MTF correction, so that the data value changes are further enhanced.

In consideration of this, the technique of Japanese Patent Laid-open Application No. 6-311359 introduces gradual changes to γ around the threshold as previously described, thereby reducing volatile changes of image data around the threshold level and preventing the subsequent image processing such as the MTF correction and smoothing from giving a detrimental effect to the image quality. This measure, however, cannot fully remove such a detrimental effect. Further, since γ is changed around the threshold, imperfection arises in that the image densities cannot be preserved around the threshold level.

In order to remove background noise of an original document, a peak-hold circuit may be used to detect a background level of analog image data, and the detected level may be fed back to an A/D converter as a reference level.

Such a means, however, ends up creating undesirable changes in scanned image levels depending on the brightness of the original document due to an effect of a black offset level and/or an amplifier offset or the like.

Here, a gain of the peak-hold circuit is denoted as A, and values of image data after subtraction of a black offset level is represented as follows with respect to digital data obtained after A/D conversion.

"Background Level Output after A/D Conversion"–"Black Level Output after A/D Conversion"="Background Level+Black Level+Offset Voltage"/"Reference Voltage of A/D Conversion"–"Black Level+Offset Voltage"/"Reference Voltage of A/D Conversion"=$((D+Vb+Voff)-(Vb+Voff))/A(D+Vb+Voff)=D/A(D+Vb+Voff)$ D: Analog Value of Scanned Background Level of Original Document, D: Black Offset Level Voff: Amplifier (or the like) Offset Level As shown above, the values of digital image data after background noise removal changes depending on the magnitude of the background density D of the original document. Because of this, the extent to which the background noise is removed undesirably varies depending on the background level.

SUMMARY OF THE INVENTION

It is a general object of the present invention to provide a scheme that substantially obviates one or more of the problems caused by the limitations and disadvantages of the related art.

It is another and more specific object of the present invention to provide a scheme for producing a scanned image that can preserve image density of original image data, and is free from peculiar appearance around a threshold level used for background noise removal.

It is yet another object of the present invention to provide a scheme for producing a scanned image that can preserve image density of original image data even after γ conversion of the image data, and is free from peculiar appearance around a threshold level used for background noise removal.

It is yet another object of the present invention to reduce manufacturing costs by achieving shared use of the γ conversion function.

It is still another object of the present invention to provide a scheme for producing a scanned image that can preserve image density of original image data even after the MTF correction of the image data, and is free from peculiar appearance around a threshold level used for background noise removal.

It is still another object of the present invention to provide a scheme for producing a scanned image that can preserve image density of original image data even after the filtering processing of the image data, and is free from peculiar appearance around a threshold level used for background noise removal.

It is still yet another object of the present invention to preserve image densities of original document image data.

It is still yet another object of the present invention to provide a simple configuration that applies the same image processing to image data and to a detected data value.

It is another object of the present invention to simplify a system configuration by sharing algorithms of image processing and background noise removal.

It is another object of the present invention to preserve a detected data value with sufficient accuracy even when the detected data value having a small data size is included in image data.

It is yet another object of the present invention to preserve a detected data value with sufficient accuracy even when the detected data value is included in image data.

It is still another object of the present invention to make it possible to select whether or not to apply image removal processing by storing image data to which image processing is already applied.

To achieve these and other advantages and in accordance with the purpose of the invention, as embodied and broadly described herein, the invention provides a device for scanning a document, including a photoelectric conversion unit which scans a document, and supplies image data of the scanned document, a background detecting unit which detects a background level of the image data, an image processing unit which applies one or more types of image processing to the image data, and applies image processing identical to the one or more types of image processing to the detected background level, and a background removal unit which removes background noise from the image data having undergone the image processing according to a threshold that is derived from the background level having undergone the image processing.

In the present invention described above, background noise removal is performed after the preferred image processing such as the MTF correction, so that there is no undesirable enhancement of image changes attributable to the background noise removal prior to the preferred image processing, yet γ is not tampered with, except for the fixing of image levels to the white level for the background noise removal. As a result, the background noise is removed without peculiar appearance around the threshold level while the image data levels are properly preserved.

It should be noted that the image processing described above may be that for achieving image quality of user preference. For example, such image processing includes γ conversion, MTF correction, a filtering process, size conversion, etc., and does not include inevitably required image processing for maintaining satisfactory image quality such as white shading correction and black shading correction.

According to another aspect of the present invention, the device as described above is such that the one or more types of image processing include γ conversion.

Accordingly, even when the γ conversion is applied the image data, the present invention produces an image without peculiar appearance around the threshold level used for background noise removal while preserving the image densities of the image data.

According to another aspect of the present invention, the device as described above is such that the γ conversion is performed at an end of the one or more types of image processing.

Accordingly, the γ conversion of the background removal unit and the γ conversion of the image processing unit can share resources, thereby reducing a production cost.

According to another aspect of the present invention, the device as described above is such that the one or more types of image processing include MTF correction.

Accordingly, even when the MTF correction is applied the image data, the present invention produces an image without peculiar appearance around the threshold level used for background noise removal while preserving the image densities of the image data.

According to another aspect of the present invention, the device as described above is such that the one or more types of image processing include a filtering process.

Accordingly, even when the filtering process is applied the image data, the present invention produces an image without peculiar appearance around the threshold level used for background noise removal while preserving the image densities of the image data.

According to another aspect of the present invention, the device as described above is such that the image processing unit applies the one or more types of image processing to the image data and the detected background level through one and same operation.

Accordingly, the image processing applied to the image data is exactly identical to the image processing applied to the detected background level, thereby enhancing the feature of preserving the image densities of the image data.

According to another aspect of the present invention, the device as described above further includes a combining unit that includes the detected background level into the image data as part of the image data prior to the image processing by the image processing unit.

This provision makes it easier to apply identical image processing to the image data and the detected background level.

According to another aspect of the present invention, the device as described above is such that the combining unit generates a gate signal indicative of a position of the detected background level included in the image data, and that the device further includes a background data extracting unit which extracts the detected background level from the image data in response to the gate signal.

Accordingly, the algorithm of the image processing unit and the background removal unit can be shared, thereby contributing to system simplification.

According to another aspect of the present invention, the device as described above is such that the one or more types of image processing includes a filtering process, and the combining unit includes the detected background level into the image data at a position of a blank period of the image data.

Accordingly, even if the detected data of a small data size is included in the image data, the detected data is not affected by a filtering process, which makes it possible to properly maintain the detected data.

According to another aspect of the present invention, the device as described above is such that the one or more types of image processing includes a filtering process, and that the combining unit includes the detected background level into the image data at a position of a valid data period of the image data such that the included detected background level has a data size larger than a filter size of the filtering process.

Accordingly, even if the detected data is included in the image data, the detected data is not affected by a filtering process, which makes it possible to properly maintain the detected data.

Moreover, an apparatus for scanning a document according to the present invention includes a memory unit which stores therein scanned image data, an input unit which receives a user instruction as to whether to perform background noise removal on the scanned image data, and a background removal unit which removes background noise from the scanned image data stored in the memory unit in response to the instruction indicative of performing of the background noise removal, and refrains from removing background noise from the scanned image data stored in the memory unit in response to the instruction indicative of non-performing of the background noise removal.

In the present invention as described above, the storing of raw image data without background noise removal gives great latitude to users in terms of what the users can do at subsequent stages of data processing.

Further, a device for scanning a document according to the present invention includes a background detecting unit which detects a background level of image data of a scanned document, a threshold generating unit which generates a threshold based on the detected background level, a clipping unit which clips to the threshold the image data above the threshold, an image processing unit which applies one or more types of image processing to the clipped image data and the threshold, and a background removal unit which removes background noise from the clipped image data having undergone the image processing according to the threshold having undergone the image processing.

In the present invention as described above, the scanned image data above a certain threshold level is clipped to the threshold level before the image data is subjected to the preferred image processing such as MTF correction, γ conversion, etc. Such clipping of the image data to the threshold level has an effect of reducing data fluctuation around the background level, thereby preventing volatile data changes around the threshold level from appearing after the preferred image processing that tend to enhance such data fluctuation. Accordingly, the subsequent background noise removal can be reliably performed.

Other objects and further features of the present invention will be apparent from the following detailed description when read in conjunction with the accompanying drawings.

BRIEF DESCRIPTION OF THE DRAWINGS

FIG. 20 is an illustrative drawing for explaining effects of data changes; and

FIG. 21 is an illustrative drawing showing a network environment in which users can access raw image data stored in the copier of the present invention.

DESCRIPTION OF THE PREFERRED EMBODIMENTS

In the following, embodiments of the present invention will be described with reference to the accompanying drawings.

Figure 1:
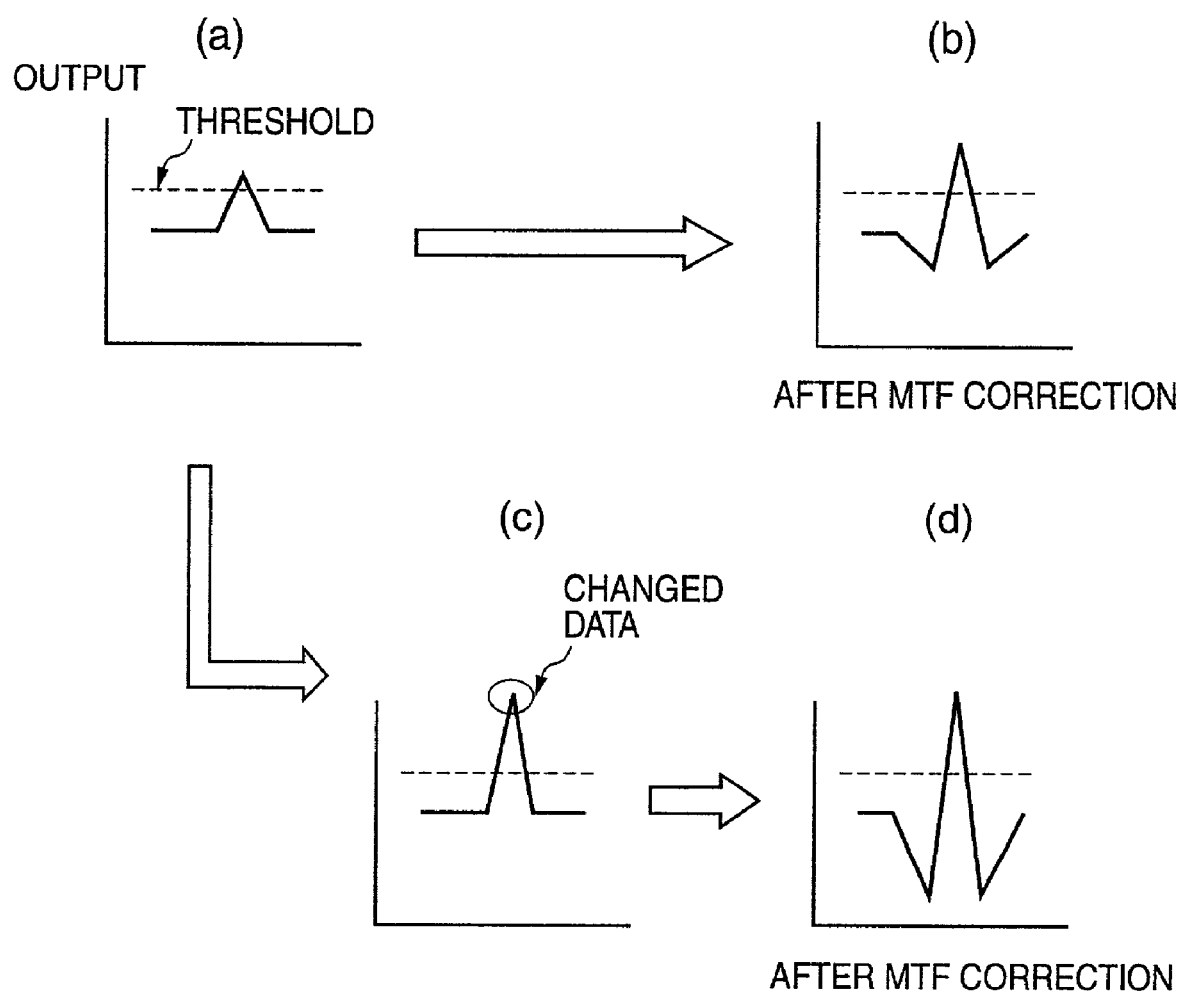
FIG. 1 is a drawing showing an example of changes of image data after MTF correction with respect to a case in which image data is changed below a threshold level and also with respect to a case in which original image data is preserved.
Figure 2:
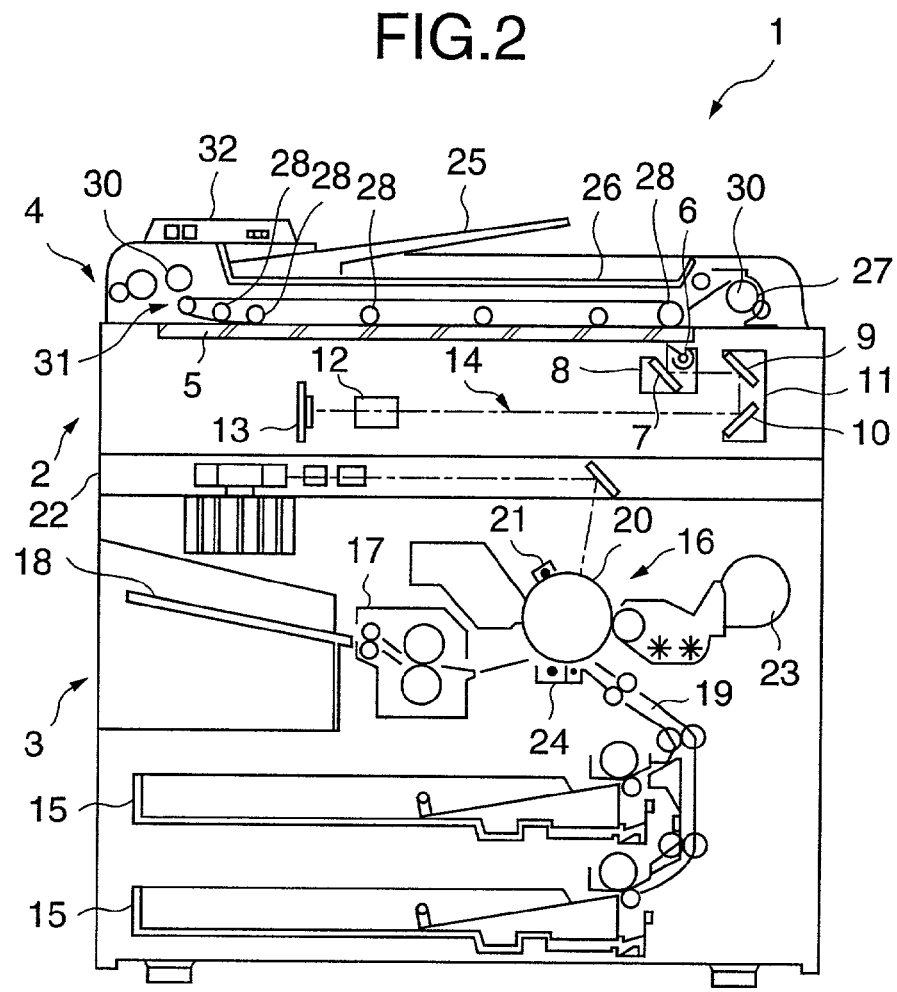
FIG. 2 is a drawing showing a schematic configuration of a copier according to a first embodiment of the present invention.

FIG. 2 is a drawing showing a schematic configuration of a copier according to a first embodiment of the present invention. A copier 1 serves as an image forming apparatus of the present invention as well as an image scanning apparatus of the present invention. The copier 1 includes an image scanner 2 for scanning an original document image, a printer unit 3 for forming the image on a paper sheet of image data scanned by the image scanner 2, and an ADF (automatic document feeder) 4 provided on the image scanner 2.

A contact glass 5 is provided as part the upper surface of the image scanner 2, on which a document to be scanned will be placed. Below the contact glass 5 is provided a first carriage 8 having an illumination lamp 6 and a mirror 7 attached thereto and capable of traveling along the extent of the contact glass 5, a second carriage 11 having mirrors 9 and 10 and capable of traveling along the extent of the contact glass 5, an image forming lens 12, and a scan optical system 14 provided with a CCD (charge coupled device) serving as an optical conversion device. The first and second carriages 8 and 11 are driven by a carriage motor (not shown) such as a stepping motor, and travel from the home position (on the right-hand side) to the left-hand side in FIG. 2 at a speed ratio of 2:1.

The printer unit 3 is provided with a paper sheet carrying path 19 that extends from a sheet feeding tray 15 having a stack of paper sheets, a printer engine 16 for forming an image on a paper sheet through photoelectric means, a fixing unit 17, etc., to an ejected sheet stacker unit 16. The printer engine 16 includes a photosensitive body 20, a charging unit 21 for uniformly charging the surface of the photosensitive body 20, an exposure unit 22 for forming a electrostatic latent image by exposing the photosensitive body 20 to light according to image data scanned by the image scanner 2, a developing unit 23 for developing the electrostatic latent image on the surface of the photosensitive body 20 by applying toner, and a transfer unit 24 for transferring a toner image from the photosensitive body 20 to a paper sheet carried through the paper sheet carrying path 19.

The ADF 4 includes a document platform 25 on which a document to be fed to the contact glass 5 is placed, and further includes a sheet ejecting unit 26 for ejecting a document for which scanning is finished. Inside the ADF 4, a document carrying path 27 is formed, extending from the document platform 25 to the sheet ejecting unit 26. Along the document carrying path 27, a belt 29 is provided that is wrapped around a plurality of rollers 28, and, also, a carrying mechanism 31 comprised of carrying rollers 30 and so on is provided. The carrying mechanism 31 is driven by an ADF motor (not shown) such as a stepping motor, and carries each document sheet stacked on the document platform 25 towards the contact glass 5. On the upper surface of the ADF 4, an operation panel 32 having a keyboard and a display is provided.

Figure 3:
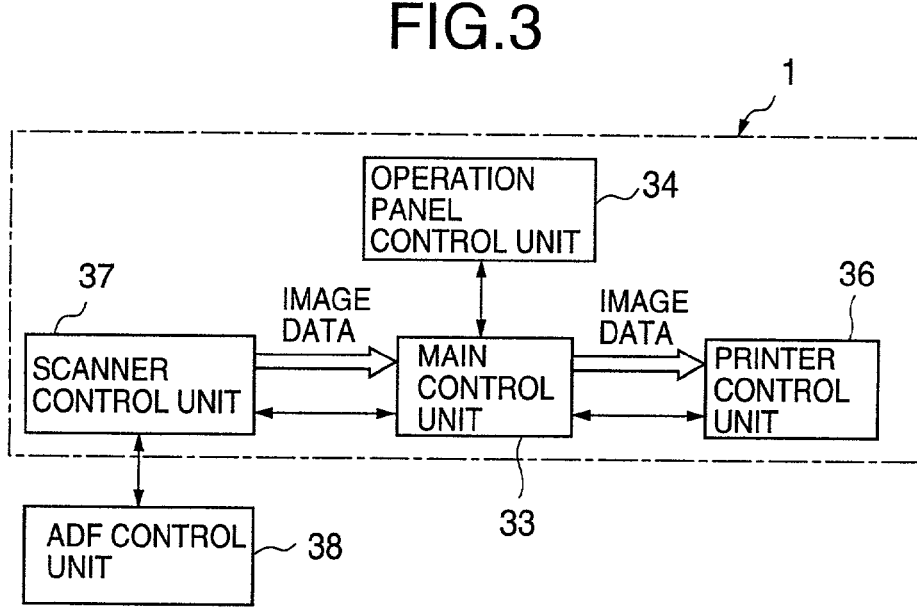
FIG. 3 is a block diagram of a control system of the copier.

FIG. 3 is a block diagram of a control system of the copier 1. In the following electrical connections of the control system of the copier 1 will be described with reference to FIG. 3.

The copier 1 includes a main control unit 33 that includes a CPU, and centrally drives and controls each part of the copier 1. The main control unit 33 is connected to a operation panel control unit 34 for controlling the operation panel 32, a scanner control unit 37 for controlling the image scanner 2, and a printer control unit 36 for controlling the printer unit 3.

The operation panel control unit 34 supplies signals to the main control unit 33 in response to input operation on the keyboard of the operation panel 32. The operation panel control unit 34 also presents information on the display in response to display data supplied from the main control unit 33.

The scanner control unit 37 supplies image data to the main control unit 33 as electric signals converted from document image data that is optically scanned by the CCD 13. The scanner control unit 37 is connected to an ADF control unit 38. The ADF control unit 38 drives the ADF motor (not shown) to feed a document sheet onto the contact glass 5 in response to a signal output from the scanner control unit 37.

The printer control unit 36 drives and controls each part of the printer unit 3 in response to image data supplied from the main control unit 33, and forms an image on a paper sheet that has been supplied from the sheet feeding tray 15 at appropriate timing. The image formation is controlled based on image data that is obtained by code identification image forming processing, which will be described later.

Figure 4:
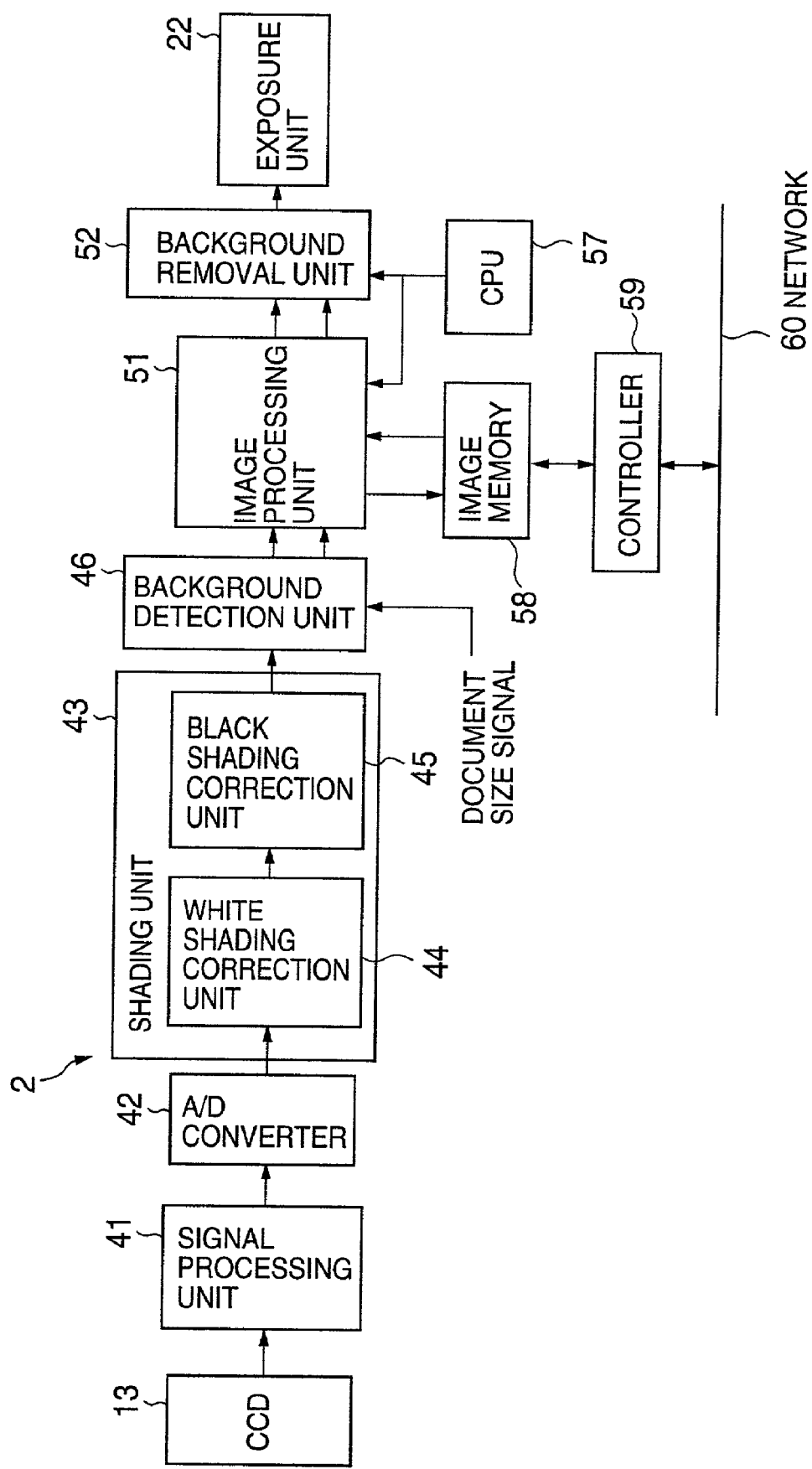
FIG. 4 is a block diagram of a circuit that performs signal processing for an image scanner.

FIG. 4 is a block diagram of a circuit that performs signal processing for the image scanner 2. As shown in FIG. 4, analog image data output from the CCD 13 is subjected to black-offset correction and the like by a signal processing unit 41, and is A/D converted into digital image data by an A/D converter 42, followed by application of black shading correction by a black shading correction unit 45 and white shading correction by a white shading correction unit 44 in a shading unit 45, then being output as image data Drd0 which is corrected with respect to uneven illumination, uneven sensitivity of the CCD 13, and the like. The white shading correction is performed based on shading data that is obtained by scanning a white reference board (not shown) prior to the scanning of a document sheet.

The image data Drd0 is supplied to a background detection unit 46, in which document background levels of the image data Drd0 are detected.

Figure 5:
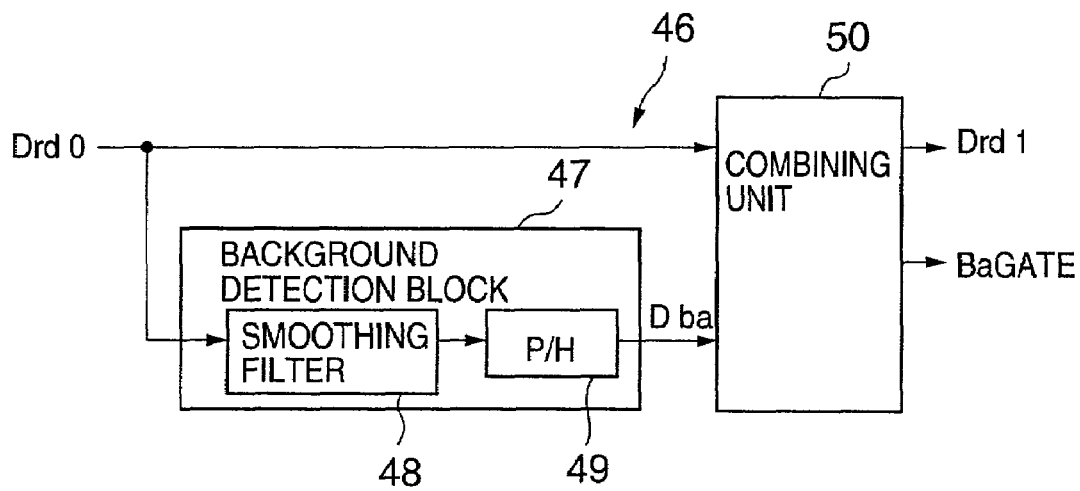
FIG. 5 is a block diagram showing a configuration of a background detection unit.

FIG. 5 is a block diagram showing a configuration of the background detection unit 46.

As shown in FIG. 5, a background detection block 47 uses a smoothing filter 48 to remove noise of the image data Drd0, and uses a peak-hold circuit 49 to detect a peak of the image data Drd0 that is output from the smoothing filter 48, thereby detecting a document background level with sufficient accuracy. The background detection block 47 serves as background detection means. In order to detect the document background, there is a need to identify an area of the image data where document information is positioned or where the background is reliably detected. For this purpose, document size information is required. A document size signal indicative of the document size is supplied from the CPU of the scanner control unit 37 to the background detection unit 46 by detecting a document size by use of an optical sensor (not shown).

The background detection block 47 outputs a detected data value Dba indicative of the document background level, which is supplied together with the image data Drd0 to a combining unit 50. The combining unit 50 attaches the detected data Dba to the image data Dcd0.

Figure 6:
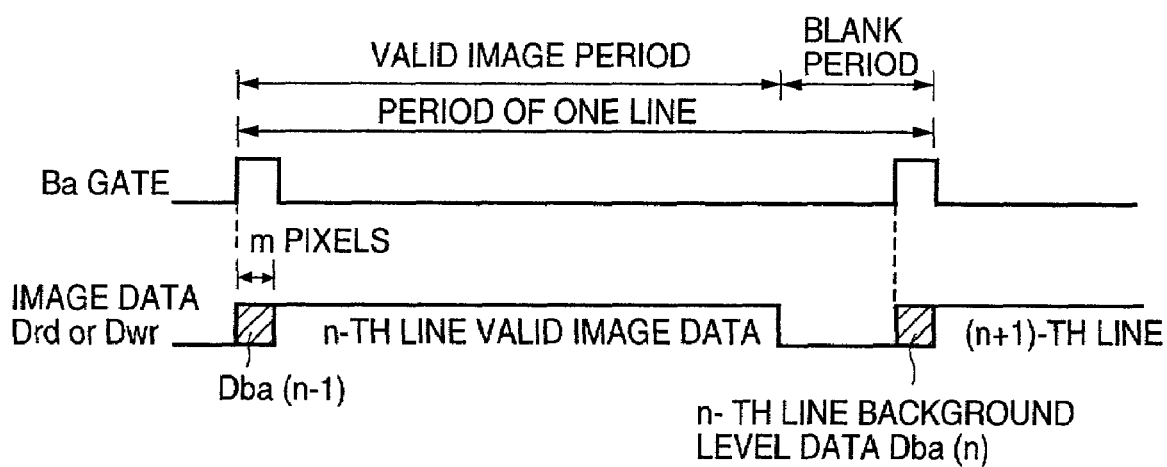
FIG. 6 is a drawing showing addition of detected data Dba to image data Dcd0.

FIG. 6 is a drawing showing addition of the detected data Dba to the image data Dcd0. As shown in FIG. 6, the detected data Dba of each line is attached to the image data Drd0 at the start of valid image data of the next line as data having the size of m pixels. Resulting image data is denoted as Drd1. The combining unit 50 serves as combining means. The image data Drd1 is supplied to an image processing unit 51 provided at a subsequent stage of the background detection unit 46. Further, the combining unit 50 supplies a gate signal BaGATE indicative of the position of the detected data Dba in the image data Drd1. In this manner, the combining unit 50 also serves as a gate signal generating means.

The image data Drd1 output from the background detection unit 46 is subjected to one or more types of image processing by the image processing unit 51 in order to achieve image quality of user preference. In this example, such image processing includes MTF correction, filtering, size conversion, γ conversion, etc. Resultant image data Dwr0 is supplied to a background removal unit 52. The image processing unit 51 serves as first and second image processing means. Setting of the γ correction may be made by operating a density adjustment key of the operation panel 32. The size conversion may be performed by setting a size conversion ratio through operation of a size conversion key provided on the operation panel 32. Further, operation of a character-document/photograph-document switch key provided on the operation panel 32 makes it possible to apply the MTF correction or a filtering process depending on whether the scanned image is a character document or a photograph document.

Figure 7:
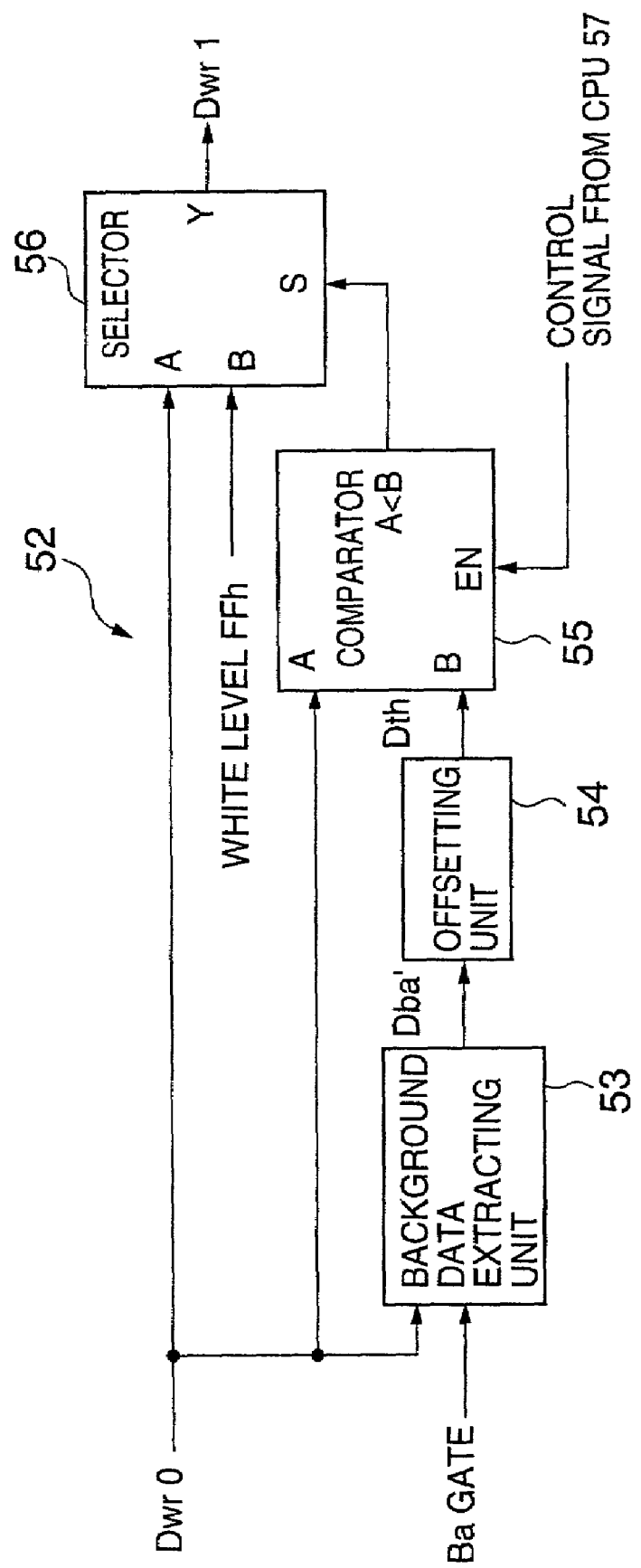
FIG. 7 is a block diagram showing a configuration of a background removal unit.

FIG. 7 is a block diagram showing a configuration of the background removal unit 52.

As shown in FIG. 7, a background data extracting unit 53 of the background removal unit 52 uses the gate signal BaGATE to extract the detected data Dba' indicative of the background level from the image data Dwr0 obtained after image processing by the image processing unit 51. The background data extracting unit 53 serves as a gate signal identifying unit. If the detected data Dba' is used as a threshold level as it is, there is a risk of outputting some background noises. In consideration of this, an offsetting unit 54 of the background data extracting unit 53 subtracts an offset from the image data Dwr0 by application of formula (1) as follows, and then subtracts a proportion thereof by application of formula (2) as follows.

$$Dth=Dba'-\text{offset} \quad (1)$$

$$Dth=Dba'(1-\alpha) \quad (2)$$

Alternatively, the following formula (3) is applied to perform operation that combines the formula (1) and the formula (2).

$$Dth=Dba'(1-\alpha)-\text{offset} \quad (3)$$

In this manner, a threshold level Dth to be used for background noise removal is obtained such as to remove the noise effect of the detected data Dba'.

Thereafter, the threshold Dth obtained as above and the image data Dwr0 are supplied to an A input and a B input of a comparator 55, respectively, thereby comparing the image data Dwr0 with the threshold level Dth. An output of the comparator 55 is controlled as shown in Table 1. According to the output of the comparator 55, a selector 56 selects one of the image data Dwr0 and a white level FFh, and outputs the selected value as image data Dwr1 (i.e., the output is the image data Dwr0 when an S terminal of the selector 56 receives 1, and is the white level FFh when the S terminal receives 0).

TABLE 1

| Comparator<br>Condition | Comparator<br>Output | Selector<br>Output Y (= Dwr1) |
|---|---|---|
| A < B | 1 | A (= Dwr0) |
| A ≧ B | 0 | B (= FFh) |

In this manner, background noise removal is performed. The background removal unit 52 serves as a background noise removal means. It should be noted that the image data Drd1 and the detected data Dba are both subjected to the same image processing by the image processing unit 51, and that the detected data Dba' having undergone the processing is used in background noise removal of the image data Dwr0 having undergone the processing. Because of this, an image without peculiar appearance around the threshold level Dth can be provided while preserving image densities.

The image data Dwr0 after the image processing by the image processing unit 51 is stored in an image memory 58 before it is supplied to the background removal unit 52. The image memory 58 serves as an memory device. A CPU 57 of the scanner control unit 37 reads the image data Dwr0 from the image memory 58, and supplies the image data Dwr0 to the background removal unit 52 while turning on or off the comparator 55 according to user selection. In this manner, the background noise removal by the background removal unit 52 is performed or not performed according to the user selection when the image data is supplied to the exposure unit 22. Such provision of a control signal from the CPU 57 to the comparator 55 serves as a selection means. In the sense that the turning on or off of the comparator 55 is controlled by operating the operation panel 32, the operation panel 32 serves as an input device.

Namely, the control signal from the CPU 57 controls an EN terminal of the comparator 55, thereby turning on or off the comparator 55 as follows:

HIGH Control Signal: Comparator On (Background Removal Mode); and

LOW Control Signal: Comparator Off and Output Level Fixed to HIGH (Background Removal Mode Unselected).

In this manner, provision of LOW to the EN terminal makes the selector 56 to choose the image data Dwr1 at all times, so that the background removal unit 52 outputs the image data Dwr1 without removing background noise.

Figure 8:
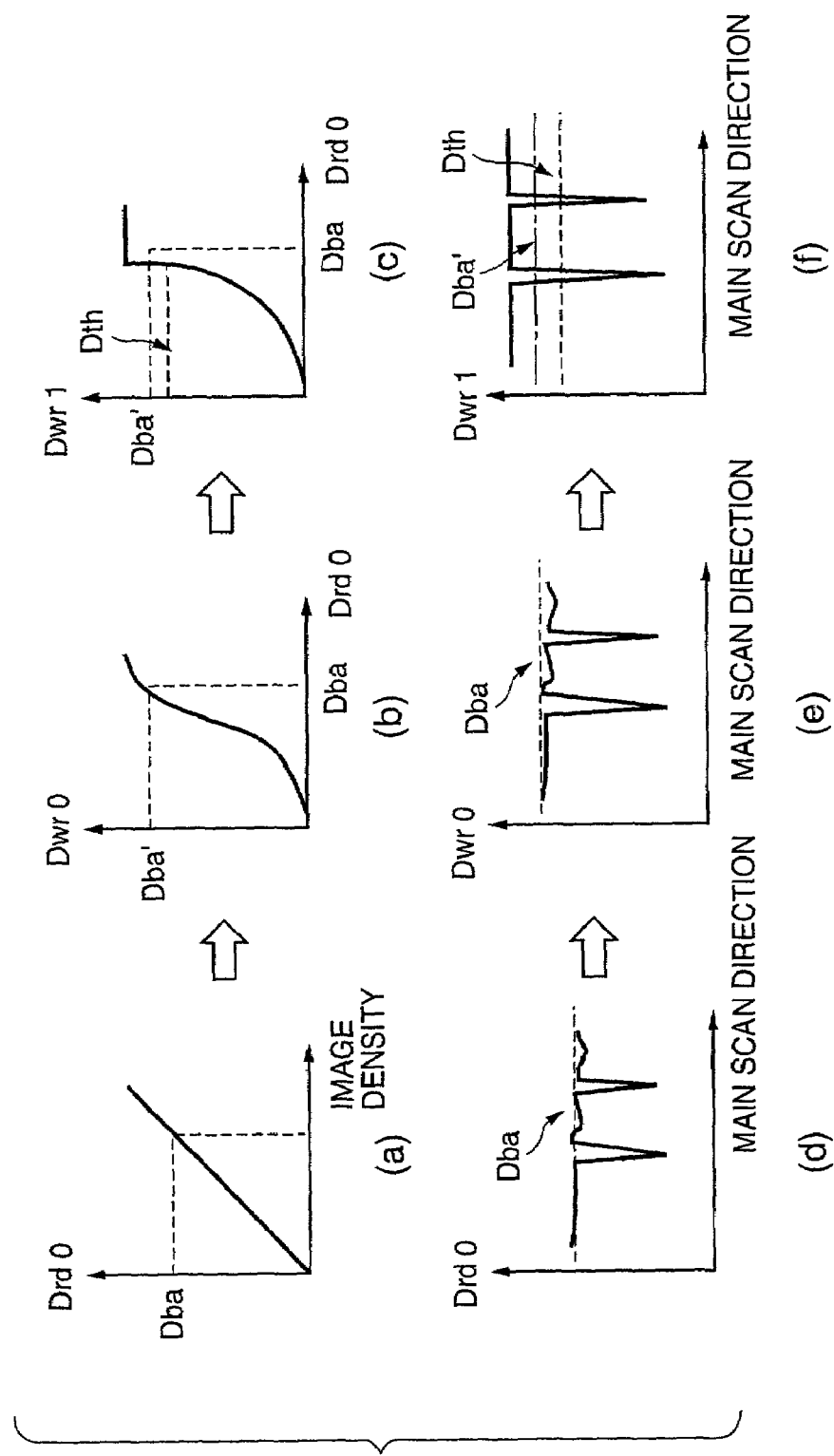
FIG. 8 is an illustrative drawing for explaining changes of image data caused by signal processing.

FIG. 8 is an illustrative drawing for explaining changes of image data caused by signal processing as described above. The image data Drd0 has characteristics as shown in FIG. 8-($a$) and FIG. 8-($d$). Here, FIG. 8-($a$) shows the relationship ($\gamma$ characteristic) between the image density and the scanned image data Drd0, and FIG. 8-($d$) shows data values of the scanned image data Drd0 in a main scan direction.

When the MTF correction, the $\gamma$ processing, and the like are applied to the image data Drd0 by the image processing unit 51 as described above, resulting image characteristics as shown in FIG. 8-($b$) and FIG. 8-($e$) are obtained. FIG. 8-($b$) shows the relationship ($\gamma$ characteristic) between the image data Drd0 and the image data Dwr0 obtained after the image processing by the image processing unit 51, and FIG. 8-($e$) shows data values of the image data Dwr0 in the main scan direction after the image processing by the image processing unit 51. FIG. 8-($e$) also shows the detected data Dba' after the image processing by the image processing unit 51. As shown, the image data characteristics are altered through the $\gamma$ correction. Further, the detected signal level indicative of the background level is changed from Dba to Dba', and the image data levels are also changed.

FIG. 8-($c$) shows the relationship ($\gamma$ characteristic) between the image data Drd0 and the image data Dwr1 obtained after the background noise removal by the background removal unit 52, and FIG. 8-($f$) shows data values of the image data Dwr1 in the main scan direction after the background noise removal by the background removal unit 52. As shown, background noise is removed while the image data levels are preserved.

The reason why the background noise is properly removed without peculiar appearance around the threshold level while the image data levels are preserved is as follows. When image levels below a predetermined threshold (above the predetermined threshold if the white level is considered to be higher than the black level) is fixed to the white level in a straightforward manner as in a conventional configuration, image data tends to have large data value changes around the threshold level. These changes are enhanced by subsequent image processing such as the MTF correction, thereby creating peculiar appearance. This peculiar appearance can be partly removed by gradually changing $\gamma$ around the threshold. This provision, however, loses the proper preservation of image densities around the threshold level. In the present invention, background noise removal is performed after the preferred image processing such as the MTF correction, so that there is no undesirable enhancement of image changes attributable to the background noise removal prior to the preferred image processing, yet $\gamma$ is not tampered with, except for the fixing of image levels to the white level for the background noise removal. As a result, the background noise is removed without peculiar appearance around the threshold level while the image data levels are properly preserved.

The difference between FIG. 8-($b$) and FIG. 8-($c$) corresponds to the function of the $\gamma$ conversion. In consideration of this, the image scanner 2 performs the $\gamma$ correction at the end among the plurality of different types of image processing by the image processing unit 51 inclusive of the MTF correction, the filtering process, the size conversion process, the $\gamma$ conversion, etc. With this provision, the image scanner 2 achieves shared use of the $\gamma$ conversion function, thereby achieving a low cost configuration that provides an image without peculiar appearance around the threshold level Dth while preserving image densities.

In the image scanner 2 of this example, the detected data Dba is included in the image data Drd0, and both of them are subjected to the same image processing by the image processing unit 51. Alternatively, separate image processing units may be provided to apply the same image processing separately to the detected data Dba and the image data Drd0.

Processing of the detected data Dba and the image data Drd0 (image data Drd1) by the same image processing unit 51 as in this example can reduce a manufacturing cost, and can insure that exactly identical processing is applied to the detected data Dba and the image data Drd0. This makes it possible to correctly preserve the image densities of document image data.

In the image scanner 2 of this example, further, the detected data Dba is included in the image data Drd0 to produce the combined image data Drd1, which is supplied to the single image processing unit 51 for application of image processing. In this configuration, therefore, image processing of the detected data Dba and the image data Drd0 by the single image processing unit 51 is readily achieved.

The image scanner 2 of this example employs a configuration that generates the gate signal BaGATE by the background detection unit 46, and extracts the detected data Dba' from the image data Drd1 by using the gate signal BaGATE. Even if the filter size is different as may be the case between different apparatuses, therefore, algorithm for the image processing unit 51 and the background removal unit 52 can be shared, thereby contributing to system simplification.

The image scanner 2 of this example sets the number m of pixels of the detected data Dba that is detected by the background detection unit 46 and included in the image data Drd0 by the combining unit 50, such that the number m is larger than the size of a filter matrix used in the filtering process of the subsequent image processing unit 51. This provision makes it possible to be free from the effect of filtering processes even though the detected data Dba is included in the Drd0, thereby correctly preserving the detected data Dba' and the background levels.

The detected data Dba may be positioned during a blank period rather than positioned at the beginning of the valid image period of the image data Drd0. In this case, even if the detected data Dba having a relatively small size is included in the image data Drd0, the data value will not be affected by the filtering process of the image processing unit 51, thereby properly preserving the detected data Dba' and the background levels.

Figure 9:
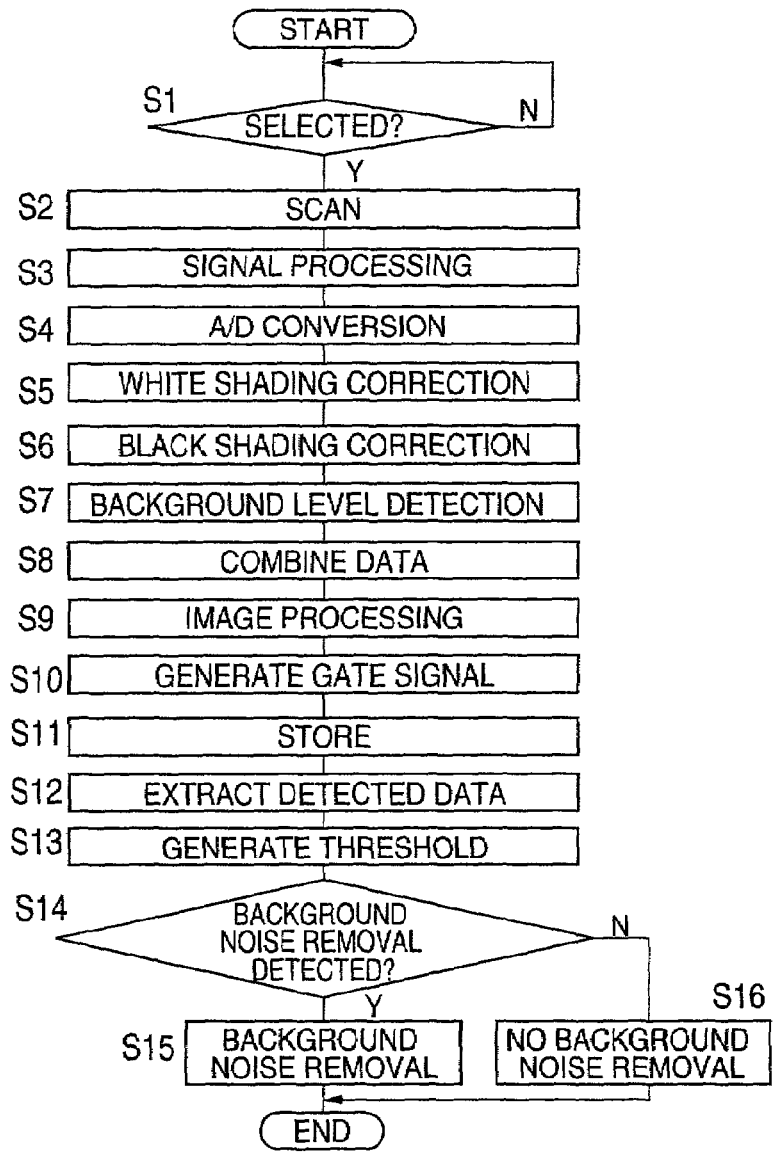
FIG. 9 is a flowchart of a series of processes that are performed from the scanning of a document image to the outputting by a printer unit.

FIG. 9 is a flowchart of a series of processes that are performed from the scanning of a document image to the outputting by the printer unit 3.

The procedure of FIG. 9 starts when a predetermined operation indicative of copying of a document is performed on the operation panel 32. The operation panel 32 accepts a user selection as to whether background noise removal is to be performed at the timing of copying a document (step S1). This corresponds to an accepting step. If selection is made (Y at the step S1), the document is scanned by use of the CCD 13 (step S2). The scanned image data is subjected to signal processing such as black offset correction by the signal processing unit 41 (step S3), and is then subjected to A/D conversion by the A/D converter 42 (step S4). Further, white shading correction (step S5) by the white shading correction unit 44 and black shading correction (step S6) by the black shading correction unit 45 are performed.

Thereafter, the background detection block 47 detects the document background level (step S7), and the combining unit 50 combines the detected data Dba with the image data Drd0 (step S8). The step S6 corresponds to a background detection step, and the step S7 corresponds to a combining step. The image data Drd1 having the detected data Dba included therein is subjected to image processing by the image processing unit 51 (step S9). The step S8 corresponds to first and second image processing steps. The combining unit 50 then generates the gate signal BaGATE (step S10), which corresponds to a gate signal generating step.

The image data Drd0 after this image processing is stored in the image memory 58 (step S11), which corresponds to a storing step. As described above, the operation panel 32 accepts a user selection as to whether the background noise removal is to be performed. This operation corresponds to an accepting step.

The background data extracting unit 53 extracts the detected data Dba' from the image data Drd0 having gone through the image processing by use of the gate signal BaGATE (step S12), which corresponds to a background data extracting step. The offsetting unit 54 generates the threshold level Dth (step S13). In response to the control signal from the CPU 57, the comparator 55 and the selector 56 remove background noise of the image data Dwr0 (step S15) if the background noise removal is enacted at step S1 (Y at step S14). If the background noise removal is not enacted at step S10 (N at step S14), the control signal from the CPU 57 deactivates the comparator 55, thereby refraining from removing background noise of the image data Dwr0 (step S16). The step S14 corresponds to a selecting step, and the step S15 corresponds to a background noise removal step.

In the following, a second embodiment of the present invention will be described.

The image scanner 2 according to the first embodiment of the present invention adopts the configuration that uses the gate signal BaGATE to identify and extract the detected data Dba' from the image data Drd1. Alternatively, a configuration that does not use the gate signal BaGATE may be employed by determining in advance the number of pixels of the detected data Dba attached to the beginning of each line of the image data Drd1. The second embodiment of the present invention is directed to such a configuration.

In the description that follows, the same elements as those of the first embodiment are referred to by the same numerals, and a description thereof will be omitted.

Figure 10:
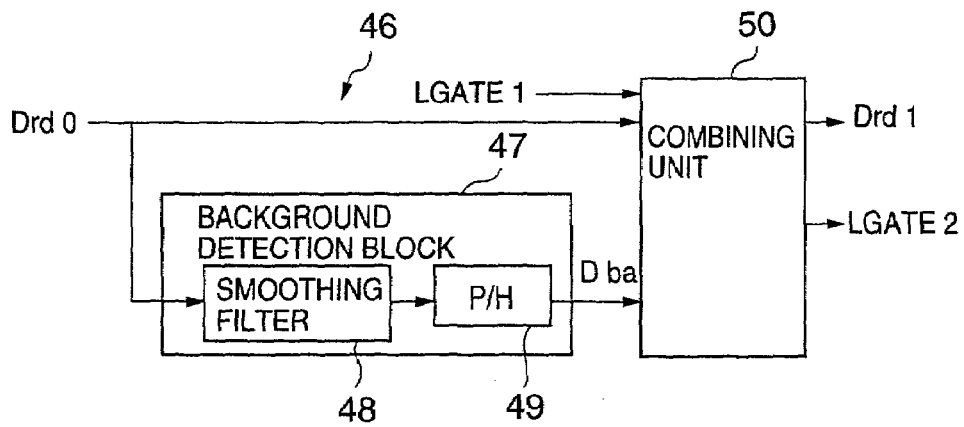
FIG. 10 is a block diagram showing a circuit configuration of a background detection unit according to a second embodiment.
Figure 11:
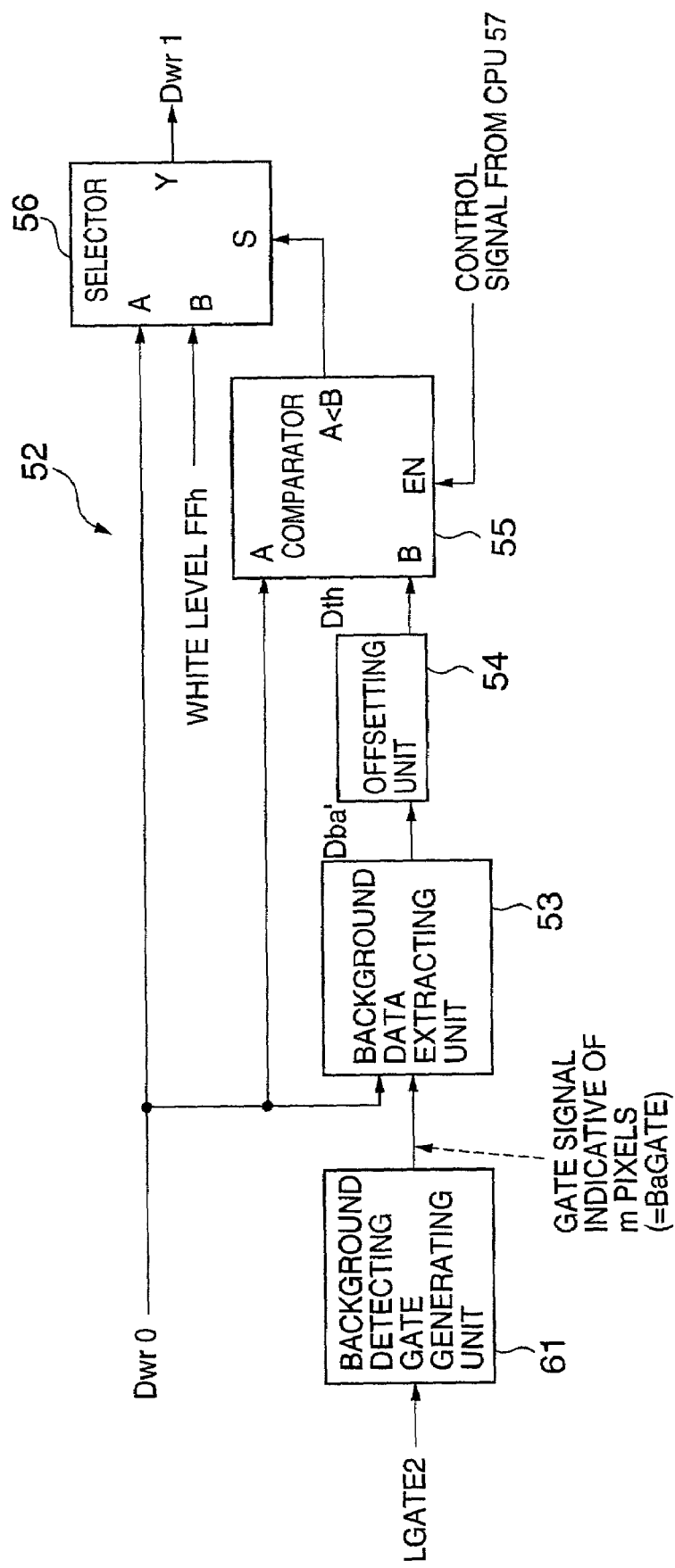
FIG. 11 is a block diagram showing a circuit configuration of a background removal unit according to the second embodiment.
Figure 12:
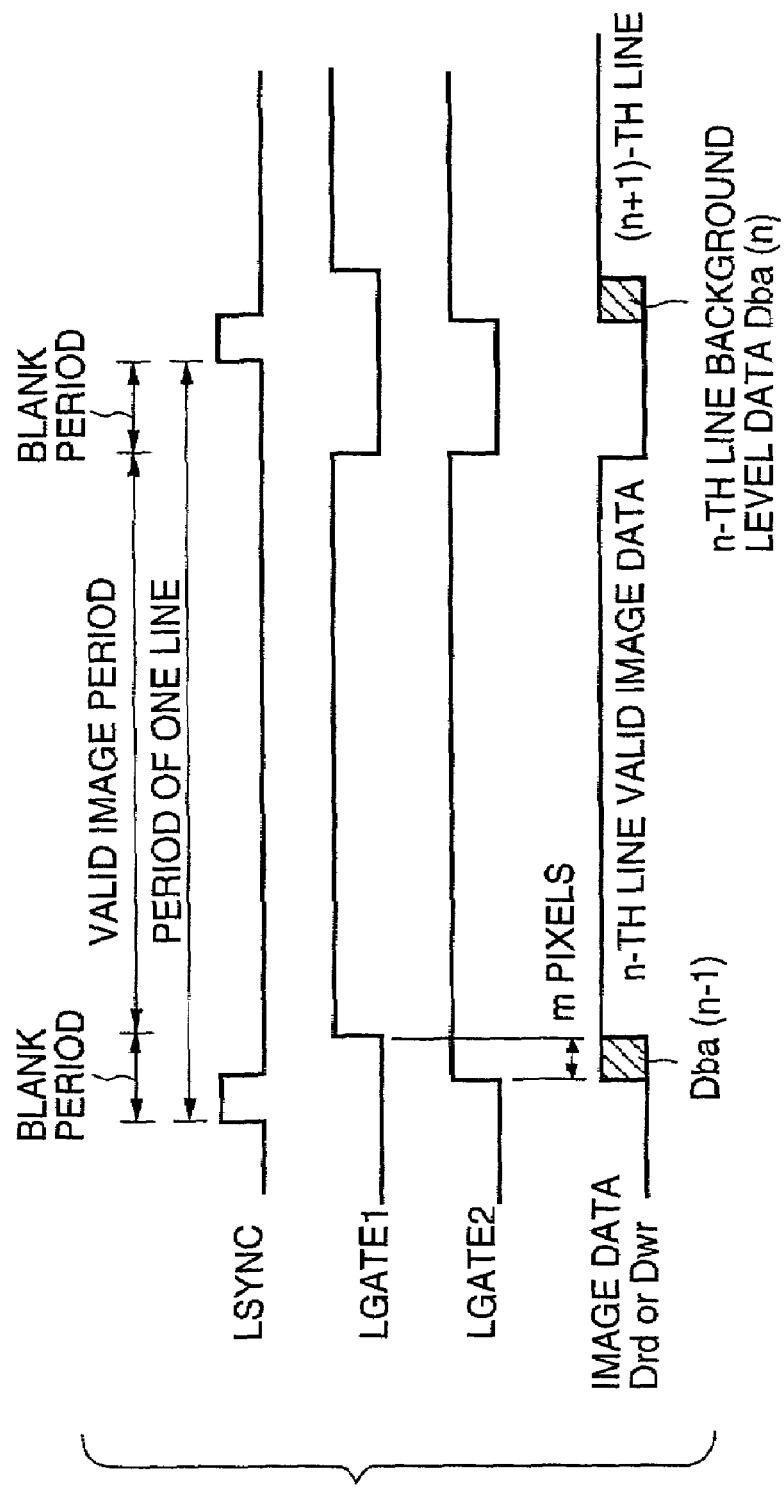
FIG. 12 is a timing chart showing timings of signals.

FIG. 10 is a block diagram showing a circuit configuration of the background detection unit 46. FIG. 11 is a block diagram showing a circuit configuration of the background removal unit 52. FIG. 12 is a timing chart showing timings of signals.

In this example, the position of the detected data Dba' in the image data Dwr0 is not identified by the gate signal BaGATE, but is identified by making settings in advance as to how many pixels are provided at which location. That is, as shown in FIG. 10 through FIG. 12, each line of the image data Drd0 has m pixels of data attached to the beginning of the valid image period where the attached data is the detected data Dba of the immediately preceding line. Further, a gate signal LGATE1 that activates the image processing of the image processing unit 51 will have m pixels of data attached to the start thereof that are equal in number to the detected data Dba of the immediately preceding line.

To this end, in the background detection unit 46, the gate signal LGATE1 is supplied to the combining unit 50 so as to generate a gate signal LGATE2 that indicates a range of valid image data of each line including the m pixels of the detected data Dba when generating the image data Drd1 having the detected data Dba attached thereto. In the background removal unit 52, a background detecting gate generating unit 61 is provided at a processing stage prior to the background data extracting unit 53, and receives the gate signal LGATE2 to generate a gate signal BaGATE for identifying the m pixels of the detected data Dba in the image data Dwr0. The gate signal BaGATE is then supplied to the background data extracting unit 53.

In the following, a third embodiment of the present invention will be described.

A basic concept that is employed in this embodiment will be described first. There are two issues to be solved by this embodiment:

image density changes by background noise removal; and
peculiar appearance of the image around the threshold when an attempt is made to preserve image densities.

Figure 13:
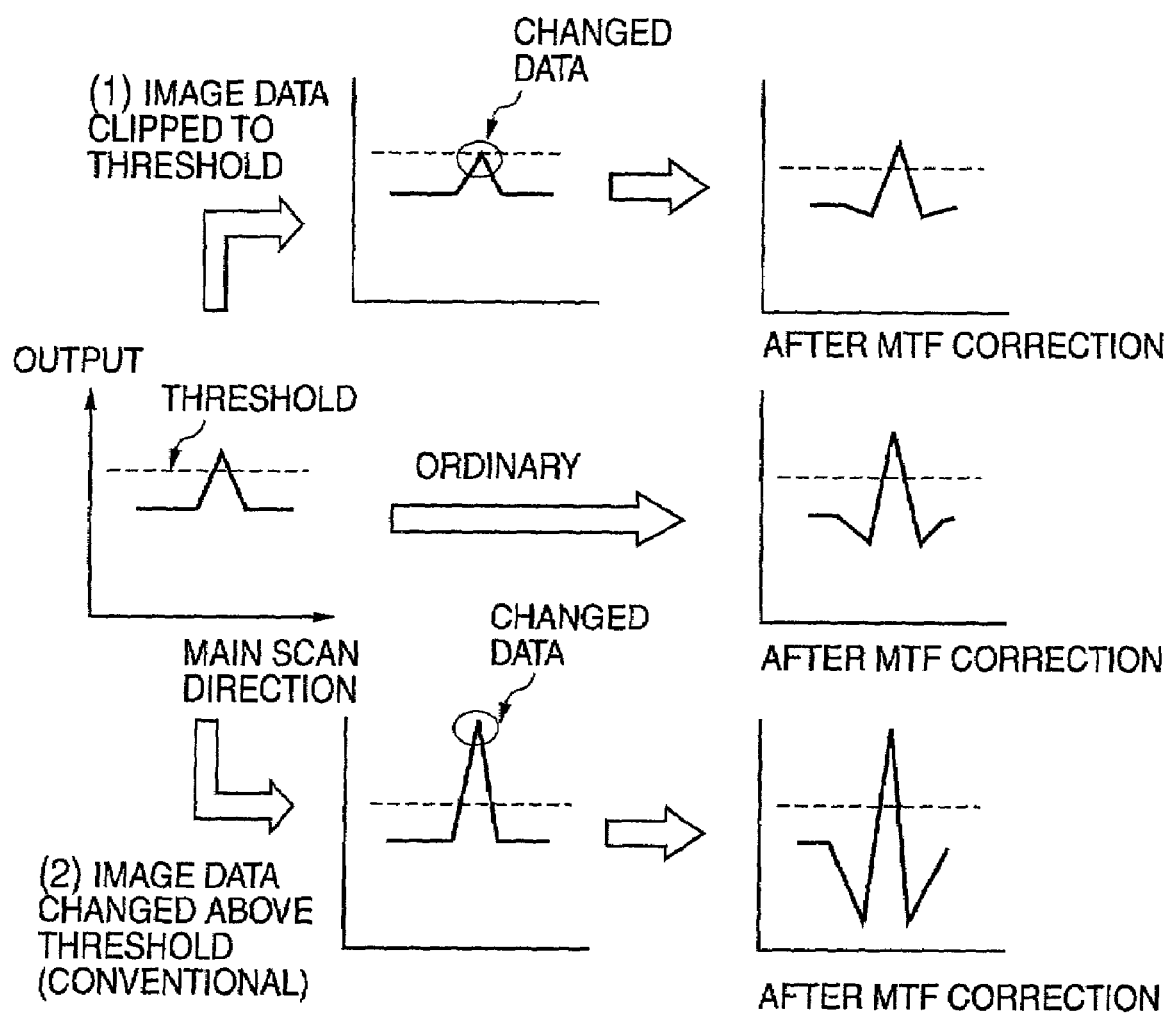
FIG. 13 is an illustrative drawing showing examples of data changes after MTF correction with respect to a case in which data is changed in response to a threshold level and with respect to a case in which ordinary processing is applied.

The reason why peculiar image appearance is created when image data above a threshold level (i.e., near while level) is discarded is that image data ends up having large data value changes around the threshold level, which are further enhanced through subsequent processing of image data that includes MTF correction and smoothing. FIG. 13 is an illustrative drawing showing examples of data changes after MTF correction with respect to a case in which data is changed in response to a threshold level and with respect to a case in which ordinary processing is applied.

In order to suppress peculiar appearance, the technique described in the Description of the Related Art introduces gradual changes to γ around the threshold level, thereby suppressing volatile changes of data levels around the threshold. This reduces a detrimental effect of the subsequent image processing such as the MTF correction and smoothing on image quality.

This technique has a disadvantage in that the changes of γ around the threshold result in image densities being not preserved around the threshold level.

As shown in FIG. 13-(1), clipping data above the threshold level to the threshold level can alleviate a detrimental effect caused by the subsequent processing. Since this is not tantamount to background noise removal, further processing is required.

In the third embodiment described below, a background level is detected from image data obtained after shading corrections, and a threshold is obtained from the detected data level, followed by clipping data above the threshold to the threshold level. Data obtained after image processing is then subjected to background noise removal (i.e., discarding of data above a certain threshold), thereby providing image without peculiar appearance around the threshold while preserving image densities near the background level even after the application of background noise removal.

Figure 14:
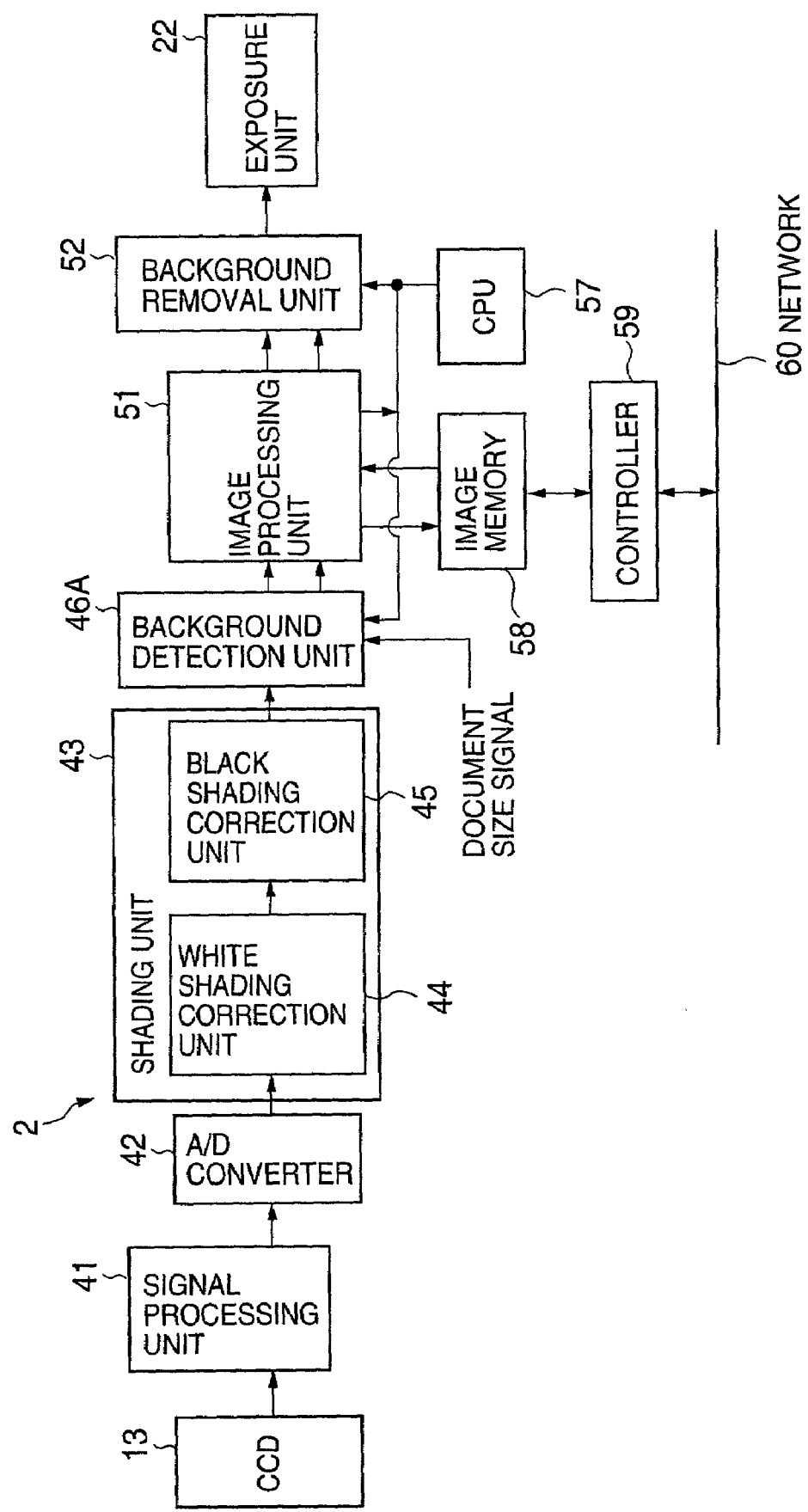
FIG. 14 is a block diagram of a circuit that performs signal processing for the image scanner according to a third embodiment.

FIG. 14 is a block diagram of a circuit that performs signal processing for the image scanner 2 according to the third embodiment. The circuit of FIG. 14 is essentially the same as that of FIG. 4, except that a background detection unit 46A replaces the background detection unit 46.

Figure 15:
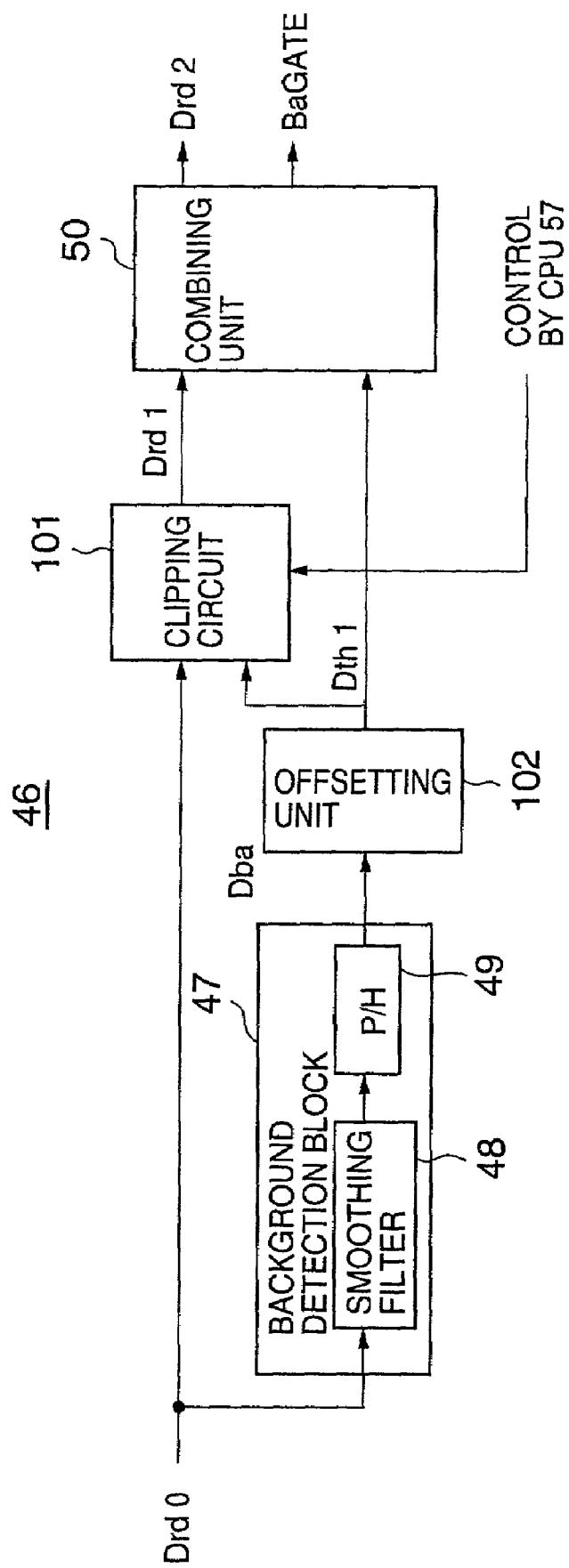
FIG. 15 is a block diagram showing a configuration of a background detection unit according to the third embodiment.

FIG. 15 is a block diagram showing a configuration of the background detection unit 46A according to the third embodiment.

In the background detection unit 46A, as shown in FIG. 15, the background detection block 47 serving as a background detecting means detects the background level Dba when the background removal mode is selected, and then obtains a threshold Dth1 by subtracting an offset by an offsetting unit 102 serving as a threshold generating means. A clipping circuit 101 compares the image data Drd0 with the threshold Dth1, and clips all the image data satisfying the condition of Drd0>Dth1 to the threshold value Dth1, thereby outputting resultant image data Drd1. Thereafter, the combining unit 50 serving as a combining means attaches m pixels of the threshold value Dth1 to the start of image data of the next line, and supplies the resultant image to the image processing unit 51 provided at a subsequent processing stage (see FIG. 14). Further, the gate signal BaGATE indicative of the position of the background level data is output at the same time. It should be noted here that the image data Drd1 and the image data Drd2 have the same image characteristics, and have a difference only in their image data format.

In the background detection block 47, the filter 48 applies filtering for the purpose of removing an effect of noise, and the peak-hold circuit 49 obtains the peak of the filtered image data, thereby producing the background level Dba with sufficient accuracy.

If the background level Dba is used as a threshold level as it is, there is a risk of outputting some background noises. In consideration of this, the offsetting unit 102 provided at a subsequent stage subtracts an offset by $D\text{th}1 = D\text{ba} - \text{offset},$ and then subtracts a proportion thereof by $D\text{th}1 = D\text{ba}(1-\alpha).$ Alternatively, the above two formulas (3) are combined as:

$D\text{th}1 = D\text{ba}(1-\alpha) - \text{offset}.$

In this manner, the threshold level Dth1 is obtained so as to remove the noise effect of background data.

Figure 16:
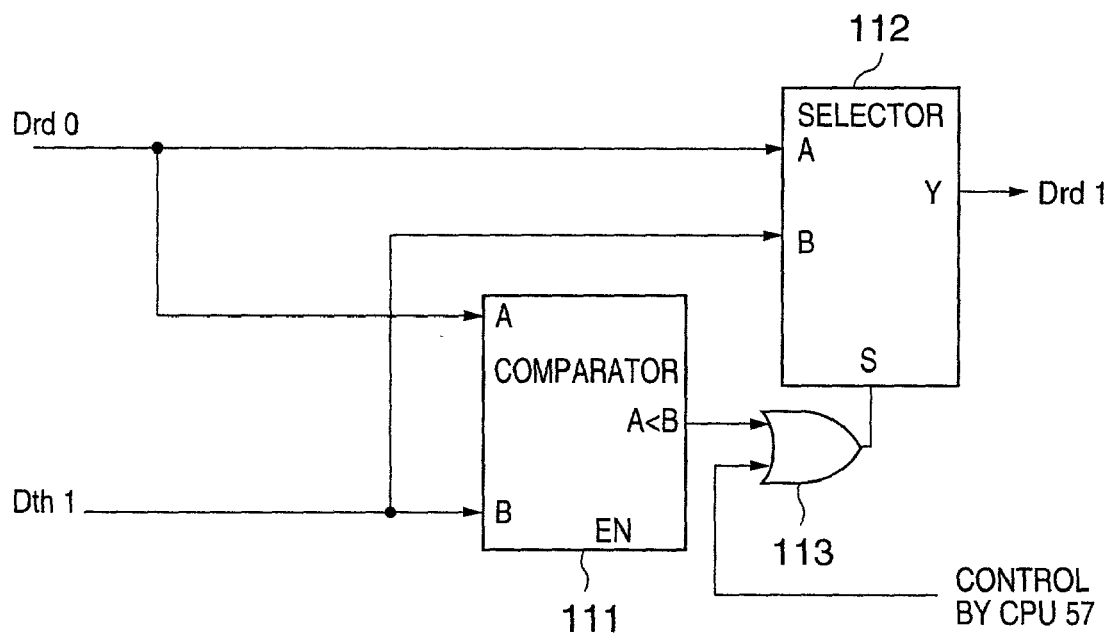
FIG. 16 is a block diagram showing a circuit configuration of a clipping circuit.

FIG. 16 is a block diagram showing a circuit configuration of the clipping circuit 101.

The clipping circuit 101 includes a comparator 111, a selector 112, and an OR circuit 113. The comparator 111 and selector 112 each receive the image data Drd0 and the threshold Dth1. The comparator 111 compares the image data Drd0 with the threshold Dth1, and outputs the result of comparison that is 1 if Drd0<Dth1, and is 0 if Drd0≧Dth1. The result of comparison is supplied to an S input of the selector 112 via the OR circuit 113 when a control signal from the CPU 57 is LOW indicating the selection of the background removal mode.

The selector 112 selects the image data Drd0 when the S input thereof is 1, and selects the threshold Dth1 when the S input thereof is 0. Namely, the image data Drd0 is selected when Drd0<Dth1, and the threshold Dth1 is selected when Drd0≧Dth1. The selected data values are supplied to the combining unit 50 as the image data Drd1. In this manner, the image data Drd1 is obtained in which pixels values above the threshold level Dth1 are clipped to the threshold Dth1.

In the above operation, if the control signal supplied from the CPU 57 is HIGH, the OR circuit 113 supplies "1" to the S input of the selector 112 at all times. This disengages the background removal mode.

Figure 17:
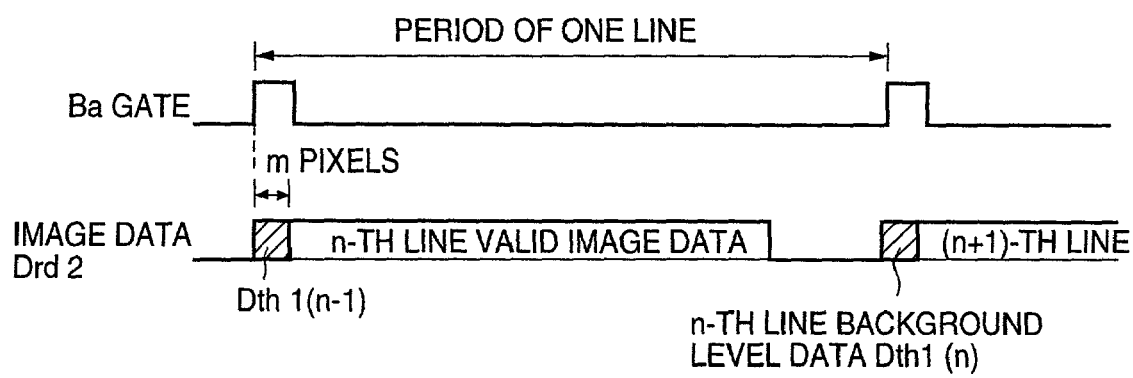
FIG. 17 is a drawing showing addition of threshold data Dth1 to image data Dcd1.

FIG. 17 is a drawing showing addition of the threshold data Dth1 to the image data Dcd1. As shown in FIG. 17, the threshold data Dth1 of a given line (n−1) is attached to the image data Drd1 at the start of valid image data of the next line (n) as data having the size of m pixels. Resulting image data is denoted as Drd2. Further, the gate signal BaGATE indicates the position of the threshold data Dth1 in the image data Drd2.

The detected threshold value Dth1 may be attached as data having the size of m pixels that is larger than the size of a filter used in the image processing unit 51 of the subsequent processing stage. Because of this, data at a center of the data window asserted by the gate signal is not affected by data positioned outside this window range, so that the background densities are properly preserved.

In this example, the gate signal BaGATE is employed as described above. Alternatively, prearrangements may be made as to the number of pixels attached to the start of the image data, thereby achieving the same effect. Use of the gate signal to clearly indicate the position of the threshold data, however, makes it possible to achieve shared use of algorithms of the image processing unit 51 and the background removal unit 52 even if filter sizes are different between apparatuses. Because of this, this embodiment employs the gate signal.

In this manner, background areas are clipped prior to the image processing unit 51. It may be possible to readily detect the background data at the background removal unit 52 provided at a later stage without passing on the threshold data. Such provision, however, may bring about a cost increase since the background detection block 47 would need to be provided at two separate locations.

The image data Drd2 output from the background detection unit 46 is subjected to the required processing (e.g., MTF correction, size conversion, γ conversion, etc.) by the image processing unit 51, and is then output as image data Dwr0. The image data Dwr0 is input into the background removal unit 52.

Figure 18:
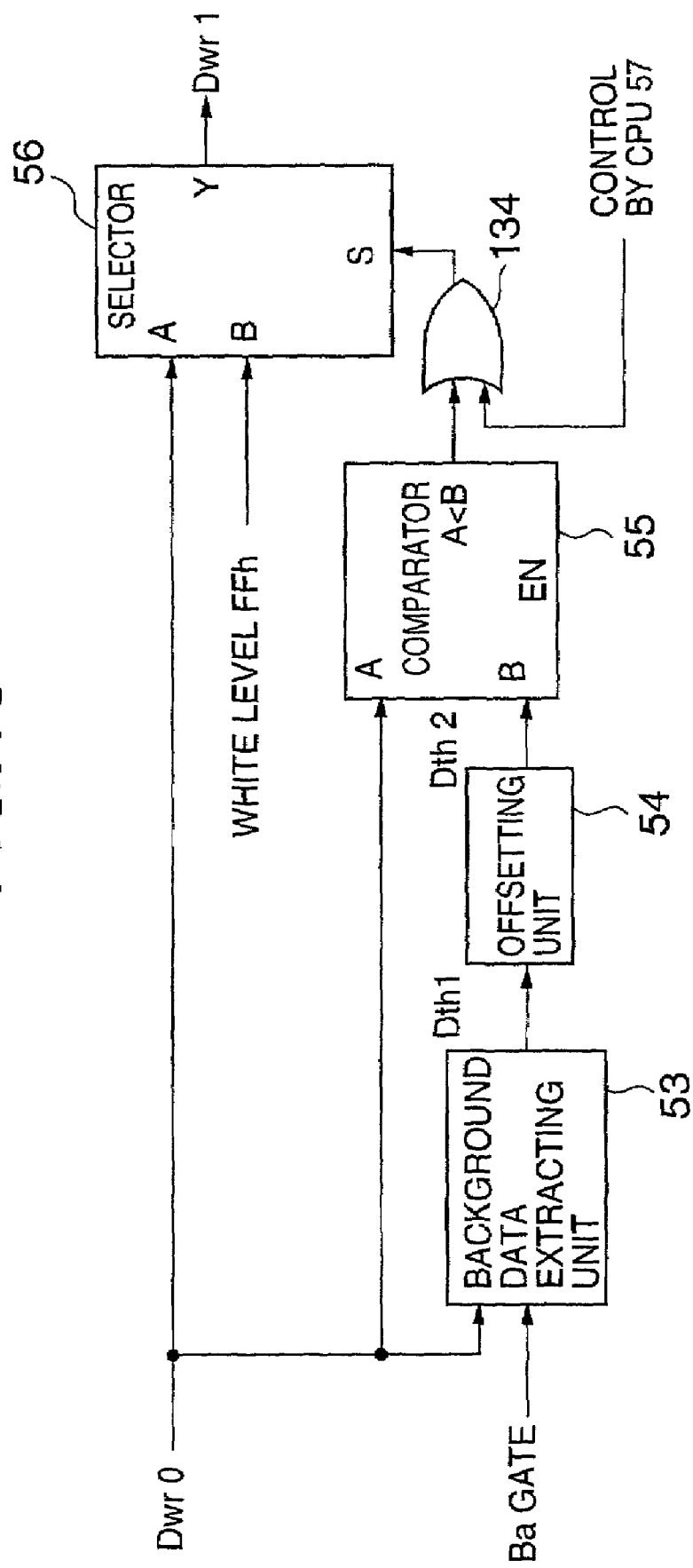
FIG. 18 is a block diagram showing a circuit configuration of a background removal unit.

FIG. 18 is a block diagram showing a circuit configuration of the background removal unit 52. The configuration of FIG. 18 is substantially the same as the configuration of FIG. 7, except for the provision of an OR gate 134 that receives a control signal from the CPU 57. Both configurations operate in the same manner, and perform the same functions. FIG. 18 simply shows a possible alternative to the configuration of FIG. 7 in which the control signal from the CPU 57 is supplied to the EN input of the comparator 55.

As shown in FIG. 18, the background data extracting unit 53 of the background removal unit 52 uses the gate signal BaGATE to extract threshold data Dth1' from the image data Dwr0 where the threshold data Dth1' is data after the image processing. If the threshold data Dth1' is used as a threshold level as it is, there is a risk of outputting amplified background noises depending on the type of image processing. In consideration of this, the offsetting unit 54 at the subsequent processing stage carries out the following processing.

An offset is subtracted by $$Dth2 = Dth1' - \text{offset},$$

and, then, a proportion of the image data is further subtracted by $$Dth2 = Dth1'(1-\alpha).$$

Alternatively, the above two operations are combined as:

$$Dth = Dba'(1-\alpha) - \text{offset}.$$

In this manner, a threshold level Dth2 is obtained such as to remove the noise effect of background noise data.

The threshold data Dth2 obtained as described above and the image data Dwr0 are supplied to an A input and a B input of the comparator 55, respectively. The comparator 55 and the selector 56 are controlled as previously described with reference to Table 1, thereby providing an image without peculiar appearance around the threshold level while preserving image densities.

In FIG. 18, when the signal from the CPU 57 is set to HIGH, the OR circuit 134 supplies "1" as an input signal S to the selector 56 at all times. This disengages the background noise removal mode.

Figure 19:
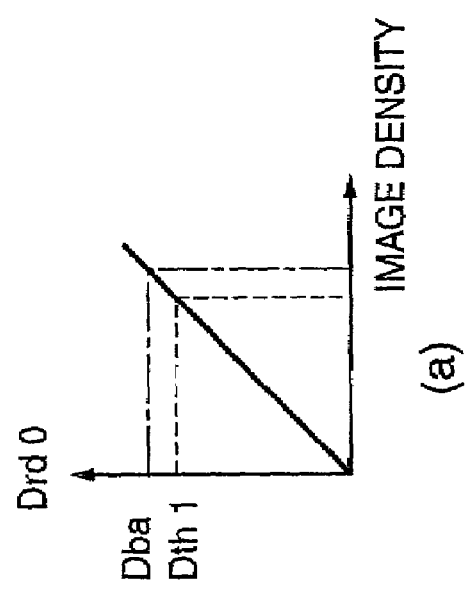
FIG. 19 is an illustrative drawing for explaining effects of changes in image γ.
Figure 19:
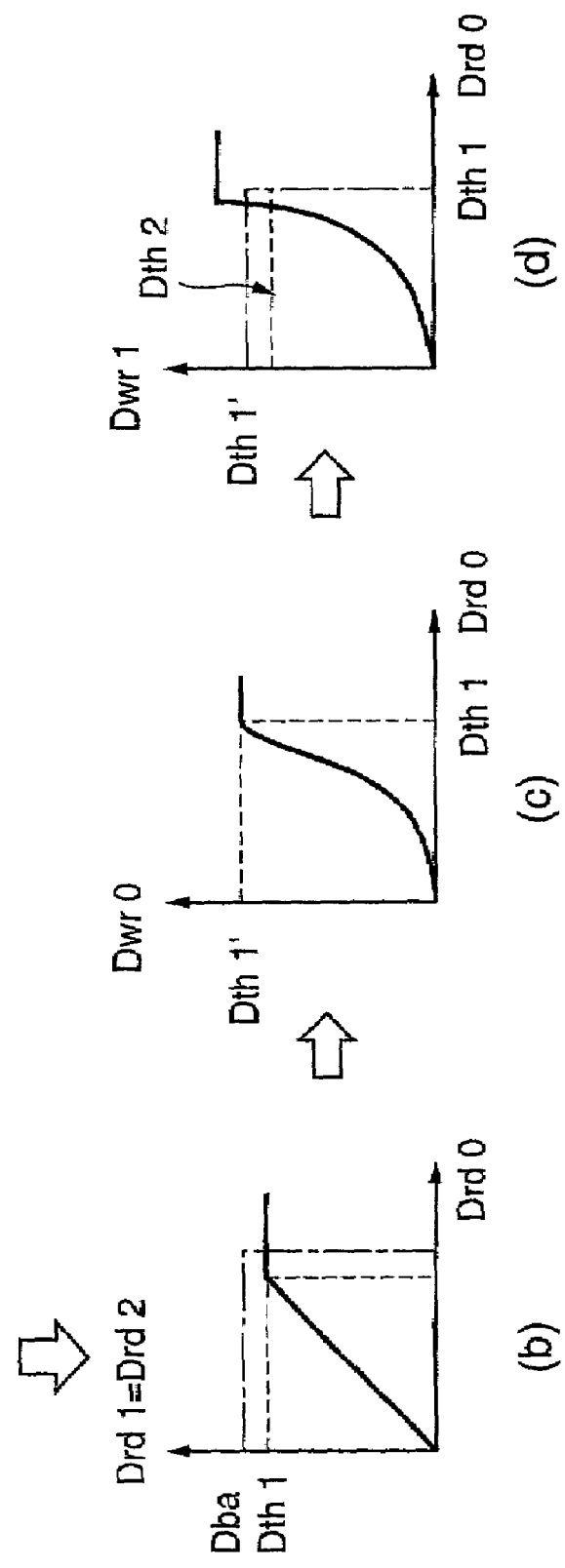

FIG. 19 and FIG. 20 are illustrative drawings for explaining effects of data changes and γ of the image.

The scanned data Drd0 has characteristics as shown in FIG. 19-(a) and FIG. 20-(a). FIG. 19-(a) shows the γ characteristic between the document and the scanned data Drd0. FIG. 20-(a) illustrates the scanned data Drd0 in a main scan direction together with a detected background level Dba and the threshold level Dth1.

After clipping by the background detection unit 46, image data has characteristics as shown in FIG. 19-(b) and FIG. 20-(b). FIG. 19-(b) demonstrates the γ characteristic between the pre-clipping scanned data Drd0 and the post-clipping scanned data Drd1 (=Drd2). FIG. 20-(b) illustrates the scanned data Drd1 in the main scan direction together with the detected background level Dba and the threshold level Dth1. As is shown, the image data is clipped to the threshold level Dth1.

Thereafter, the image processing unit 51 applies MTF correction, γ conversion, etc. As a result, the γ characteristic between the scanned data Drd0 and the post-image-processing data Dwr0 is obtained as illustrated in FIG. 19-(c). FIG. 20-(c) shows the post-image-processing data Dwr0 in the main scan direction together with the threshold level Dth1' after the image processing.

As can be seen from the figures, γ is converted, and the threshold level is changed. Also, image levels are altered.

After the background noise removal, the data Dwr1 has the γ characteristic relative to the scanned data Drd0 as shown in FIG. 19-(d). FIG. 20-(d) shows the data Dwr1 after the background noise removal in the main scan direction together with the threshold levels Dth1' and Dth2.

As can be seen from FIG. 19-(d) and FIG. 20-(d), the advantage of the third embodiment is apparent in that the background noise level is removed while image information levels are preserved.

The difference between FIG. 19-(c) and FIG. 19-(d) corresponds to the function of γ conversion. Because of this, providing the γ conversion function at the end of the image processing unit 51 makes it possible to share the γ function, thereby achieving a reduction in manufacturing costs.

In general, an order in which different types of image processing are performed is altered depending on the image mode and a ratio of size conversion. Depending on various conditions such as mode settings, the function and order of the image processing by the image processing unit 51 may be changed, thereby achieving higher image quality.

In the third embodiment as described above, the scanned image data above a certain threshold level is clipped to the threshold level before the image data is subjected to the preferred image processing such as MTF correction, γ conversion, etc. Such clipping of the image data to the threshold level has an effect of reducing data fluctuation around the background level, thereby preventing volatile data changes around the threshold level from appearing after the preferred image processing that tend to enhance such data fluctuation. Accordingly, the subsequent background noise removal can be reliably performed.

In the following, a description will be given with respect to the provision of choices for use to make in terms of image processing.

As described in connection with the first embodiment, a user can operate the operation panel 32 to select whether or not to perform the background noise removal process.

According to this user selection, the background noise removal by the background removal unit 52 is performed or not performed when the image data is supplied to the exposure unit 22. In this configuration, the image memory 58 may store therein the scanned image data on which only the shading corrections are performed. That is, the scanned image data may be stored in the image memory 58 before the preferred image processing such as MTF correction, γ conversion, and so on is performed. Such scanned image data stored in the image memory 58 are substantially the same as raw image data, except for correction of scanner-specific optical characteristics such as shading correction. Such a configuration can also be made with respect to the second embodiment and the third embodiment.

With this provision, the user is in the possession of raw image data in the image memory 58, and may select image processing of user preference. In this manner, the selected image processing can be applied to the raw image data. In the conventional configuration, on the other hand, a background removal unit removes background noise before the required processing is performed and thus before the image data is stored in memory. In such a case, a user is not in the possession of raw image data, and has no choice but to apply selected image processing to the image data that has already undergone some transformation, i.e., the background noise removal. Since processing of such transformed image data is not the same as processing of raw image data, the user may not be able to obtain the results that the user wants.

As shown in FIG. 4, the image memory 58 may be connected to a network 60 via a controller 59. In this configuration, users operating apparatus connected to the network 60 can access the image memory 58 via the controller 59, retrieve raw image data from the image memory 58, and apply image processing of user preference to the retrieved raw image data.

FIG. 21 is an illustrative drawing showing a network environment in which users can access raw image data stored in the copier of the present invention.

As described in connection with FIG. 4, the copier 1 of the present invention is connected to the network 60. To the network 60, other devices and apparatuses are also connected, including a scanner 141, a printer 142, a computer 143, a copier 144, and a printer 145. A user operating the computer 143 may access the image memory 58 of the copier 1 so as to retrieve raw image data from the copier 1. After applying preferred image processing, the user may print the processed image data from the printer 142 or 145. Alternatively, the user may decide to print the raw image data as it is from the printer 142 or 145. By the same token, the copier 144 may be provided with a function to retrieve image data from other apparatuses, so that a user operating the copier 144 may access the image memory 58 of the copier 1 and retrieve raw image data from the copier 1. The retrieve raw image may be printed by using the print function of the copier 144 after preferred image processing, or may be printed as raw data without any image processing. The scanner 141 may also be provided with the control circuit of FIG. 4, thereby allowing external devices to access raw image data stored in the internal memory thereof.

In the present invention as described above, the storing of raw image data without background noise removal or other image processing gives great latitude to the users in terms of what the users can do at subsequent stages of data processing.

Further, the present invention is not limited to these embodiments, but various variations and modifications may be made without departing from the scope of the present invention.

The present application is based on Japanese priority applications No. 2000-291615 filed on Sep. 26, 2000 and No. 2001-073507 filed on Mar. 15, 2001, with the Japanese Patent Office, the entire contents of which are hereby incorporated by reference.

What is claimed is:

1. A device for scanning a document, comprising:
    a photoelectric conversion unit which scans a document, and supplies image data of the scanned document;
    a background detecting unit which detects a background level of the image data so as to produce original background level value data that is separate from and not part of the image data and indicative of the background level;
    an image processing unit which applies one or more types of image processing to the image data, and applies image processing identical to said one or more types of image processing to the original background level value data to produce image processed modified background level value data; and
    a background removal unit which generates a threshold derived from the image processed modified background level value data, and which utilizes said generated threshold to remove background noise from the image processed data.

2. The device as claimed in claim 1, wherein said one or more types of image processing includes γ conversion.

3. The device as claimed in claim 2, wherein the γ conversion is performed at an end of said one or more types of image processing.

4. The device as claimed in claim 1, wherein said one or more types of image processing includes MTF correction.

5. The device as claimed in claim 1, wherein said one or more types of image processing includes a filtering process.

6. The device as claimed in claim 1, wherein said image processing unit applies said one or more types of image processing to the image data and the original detected background level through one operation.

7. The device as claimed in claim 6, further comprising a combining unit which includes the detected original background level into the image data as part of the image data prior to the image processing by said image processing unit.

8. The device as claimed in claim 7, wherein said combining unit generates a gate signal indicative of a position of the detected background level included in the image data, said device further comprising a background data extracting unit which extracts the detected original background level from the image data in response to the gate signal.

9. The device as claimed in claim 7, wherein said one or more types of image processing includes a filtering process, and said combining unit includes the detected original background level into the image data at a position of a blank period of the image data.

10. The device as claimed in claim 7, wherein said one or more types of image processing includes a filtering process, and said combining unit includes the detected original background level into the image data at a position of a valid data period of the image data such that the included detected background level has a data size larger than a filter size of said filtering process.

11. The device as claimed in claim 1, further comprising a printer unit which prints an image on a paper sheet according to the image data from which the background noise is removed by said background removal unit.

12. The device as claimed in claim 1, wherein the background detecting unit is configured to append, in a same data file for subsequent processing with the image data, the original background level value data to the image data in a part of the data file concatenated from the image data.

13. An apparatus for scanning a document, comprising:
a memory unit which stores therein scanned image data and original background level value data that is separate from the scanned image data;
an input unit which receives a user instruction making a choice between performing of background noise removal on the scanned image data and non-performing of the background noise removal on the scanned images; and
a background removal unit which generates a threshold derived from image processed modified background level value data, and which utilizes said generated threshold to remove background noise from the scanned image data stored in said memory unit in response to the user instruction indicative of performing of the background noise removal, and refrains from removing background noise from the scanned image data stored in said memory unit in response to the user instruction indicative of non-performing of the background noise removal,
wherein in response to the user instruction indicative of performing of the background noise removal, said original background level value data is modified by image processing identical to that applied to the scanned image data to produce said image processed modified background level value data.

14. The apparatus as claimed in claim 13, further comprising a controller which connects said memory unit to an external network so as to allow access to be made from the external network to the scanned image data stored in said memory unit.

15. A method of processing image data, comprising:
detecting a background level of image data of a scanned document so as to produce original background level value data indicative of the background level;
applying one or more types of image processing to the image data so as to generate image processed data, and applying image processing identical to said one or more types of image processing to the original background level value data that is separate from and not part of the image data to produce modified background level value data;
generating a threshold derived from image processed modified background level value data and
removing background noise from the image processed data having according to the generated threshold that is derived from the image processed modified background level value data.

16. The method as claimed in claim 15, wherein said one or more types of image processing includes γ conversion.

17. The method as claimed in claim 15, wherein the γ conversion is performed at an end of said one or more types of image processing.

18. The method as claimed in claim 15, wherein said one or more types of image processing includes MTF correction.

19. The method as claimed in claim 15, wherein said one or more types of image processing includes a filtering process.

20. The method as claimed in claim 15, wherein said image processing step applies said one or more types of image processing to the image data and the detected original background level value data through one operation.

21. The method as claimed in claim 20, further comprising combining the detected original background level value data into the image data as part of the image data prior to the image processing.

22. The method as claimed in claim 21, further comprising:
generating a gate signal indicative of a position of the detected original background level value data included in the image data; and
extracting the detected original background level value data from the image data in response to the gate signal.

23. The method as claimed in claim 21, wherein said one or more types of image processing includes a filtering process, and said combining combines the detected original background level value data into the image data at a position of a blank period of the image data.

24. The method as claimed in claim 21, wherein said one or more types of image processing includes a filtering process, and said combining combines the detected original background level value data into the image data at a position of a valid data period of the image data such that the included detected original background level value data has a data size larger than a filter size of said filtering process.

25. The method as claimed in claim 15, wherein detecting comprises:
appending, in a same data file for subsequent processing with the image data, the original background level value data to the image data in a part of the data file concatenated from the image data.

26. A method of scanning a document, comprising:
storing scanned image data and original background level value data that is separate from the scanned image data in memory;
accepting a user instruction making a choice between performing of background noise removal on the scanned image data and not-performing of the background noise removal on the scanned image data; and
removing background noise from the scanned image data stored in said memory in response to the user instruction indicative of performing of the background noise removal, and refraining from removing background noise from the scanned image data stored in said memory in response to the user instruction indicative of non-performing of the background noise removal,
wherein in response to the user instruction indicative of performing of the background noise removal, modifying said original background level value data by image processing identical to that applied to the scanned image data and generating a threshold derived from image processed modified background level value data by which to remove the background noise.

27. The method as in claim 26, further comprising allowing access to be made from an external network to the scanned image data stored in said memory.

28. A device for scanning a document, comprising:
scanning means for scanning a document, and for supplying image data of the scanned document;
background detecting means for detecting a background level of the image data so as to produce original background level value data that is separate from and not part of the image data and indicative of the background level;
image processing means for applying one or more types of image processing to the image data so as to generate image processed data, and for applying image processing identical to said one or more types of image processing to the original background level value data to produce image processed modified background level value data; and background removal means for generating a threshold derived from the image processed modified background level value data, and for utilizing said generated threshold to remove background noise from the image processed data.

29. The device as claimed in claim 28, wherein the background detecting means are configured to append, in a same data file for subsequent processing with the image data, the original background level value data to the image data in a part of the data file concatenated from the image data.

30. A device for scanning a document, comprising:
a background detecting unit which detects background level data of image data of a scanned document;
a threshold generating unit which determines a threshold based on the detected background level data so as to produce an original threshold level value indicative of the threshold;
a clipping unit which clips to the threshold the image data above the original threshold level value;
an image processing unit which applies one or more types of image processing to the clipped image data so as to generate clipped image processed data and further to the original threshold level value to produce a modified threshold level value; and
a background removal unit which removes background noise from the clipped image data according to a generated threshold that is derived from the modified threshold level value.

31. The device as claimed in claim 30, further comprising a combining unit that includes the threshold into the clipped image data as part of the clipped image data prior to the image processing by said image processing unit.

32. The device as claimed in claim 31, wherein said one or more types of image processing includes a filtering process, and said combining unit includes the threshold into the clipped image data at a position of a valid data period of the clipped image data such that the included threshold has a data size larger than a filter size of said filtering process.

33. The device as claimed in claim 30, wherein the background detecting unit is configured to append, in a same data file for subsequent processing with the image data, the original background level value data to the image data in a part of the data file concatenated from the image data.

34. A device for scanning a document, comprising:
background detecting means for detecting a background level of image data of a scanned document;
threshold generating means for determining a threshold based on the detected background level so as to produce an original threshold level value that is separate from and not part of the clipped image data and indicative of the threshold;
clipping means for clipping to the original threshold the image data above the threshold;
image processing means for applying one or more types of image processing to the clipped image data so as to generate clipped processed data and further to the original threshold level value to produce a modified threshold level value; and
background removal means for removing background noise from the clipped image data according to a generated threshold that is derived from the modified threshold level value.

35. The device as claimed in claim 34, wherein the background detecting means are configured to append, in a same data file for subsequent processing with the image data, the original background level value data to the image data in a part of the data file concatenated from the image data.

* * * * *